(12) United States Patent
Striemer et al.

(10) Patent No.: US 8,182,590 B2
(45) Date of Patent: May 22, 2012

(54) ULTRATHIN POROUS NANOSCALE MEMBRANES, METHODS OF MAKING, AND USES THEREOF

(75) Inventors: Christopher C. Striemer, Rochester, NY (US); Philippe M. Fauchet, Pittsford, NY (US); Thomas R. Gaborski, Pittsford, NY (US); James L. McGrath, Fairport, NY (US)

(73) Assignee: University of Rochester, Rochester, NY (US)

( * ) Notice: Subject to any disclaimer, the term of this patent is extended or adjusted under 35 U.S.C. 154(b) by 631 days.

(21) Appl. No.: 11/414,991

(22) Filed: May 1, 2006

(65) Prior Publication Data

US 2006/0278580 A1    Dec. 14, 2006

Related U.S. Application Data

(60) Provisional application No. 60/675,963, filed on Apr. 29, 2005, provisional application No. 60/782,001, filed on Mar. 14, 2006.

(51) Int. Cl.
*B01D 53/22* (2006.01)
*B01D 39/00* (2006.01)
*B01D 39/14* (2006.01)
*B01D 71/04* (2006.01)

(52) U.S. Cl. ............. 96/4; 96/5; 96/6; 96/7; 96/8; 96/9; 96/10; 96/11; 96/12; 96/13; 96/14; 96/54; 96/55; 96/56; 210/500.21; 210/500.25; 210/500.27; 210/640

(58) Field of Classification Search .................. 210/650, 210/500.25, 506, 646, 321.84; 216/56, 2; 96/4; 95/45; 435/4
See application file for complete search history.

(56) References Cited

U.S. PATENT DOCUMENTS

| 4,191,182 A * | 3/1980 | Popovich et al. ............ 604/6.01 |
| 4,329,157 A | 5/1982 | Dobo et al. |
| 4,557,995 A | 12/1985 | Broers et al. |
| 4,784,721 A | 11/1988 | Holmen et al. |

(Continued)

FOREIGN PATENT DOCUMENTS

DE    10353894 A1    2/2005

(Continued)

OTHER PUBLICATIONS

Chen et al., Enhancement of electron mobility in nanocrystalline silicon/crystalline silicon heterostructures, Dec. 27, 2004, Journal of Applied Physics 97, 024305, pp. 1-5.*

(Continued)

*Primary Examiner* — Krishnan S Menon
*Assistant Examiner* — Dirk Bass
(74) *Attorney, Agent, or Firm* — LeClairRyan, a Professional Corporation

(57) ABSTRACT

A process for forming a porous nanoscale membrane is described. The process involves applying a nanoscale film to one side of a substrate, where the nanoscale film includes a semiconductor material; masking an opposite side of the substrate; etching the substrate, beginning from the masked opposite side of the substrate and continuing until a passage is formed through the substrate, thereby exposing the film on both sides thereof to form a membrane; and then simultaneously forming a plurality of randomly spaced pores in the membrane. The resulting porous nanoscale membranes, characterized by substantially smooth surfaces, high pore densities, and high aspect ratio dimensions, can be used in filtration devices, microfluidic devices, fuel cell membranes, and as electron microscopy substrates.

75 Claims, 27 Drawing Sheets

U.S. PATENT DOCUMENTS

| | | | |
|---|---|---|---|
| 4,824,568 A | | 4/1989 | Allegrezza, Jr. et al. |
| 5,334,314 A | | 8/1994 | Neel et al. |
| 5,354,695 A | * | 10/1994 | Leedy ..................... 438/411 |
| 5,413,679 A | | 5/1995 | Godbey |
| 5,503,657 A | | 4/1996 | Bouard et al. |
| 5,552,046 A | * | 9/1996 | Johnston et al. ............ 210/266 |
| 5,567,302 A | | 10/1996 | Song et al. |
| 5,595,646 A | | 1/1997 | Foos et al. |
| 5,753,014 A | * | 5/1998 | Van Rijn ..................... 96/12 |
| 5,904,545 A | | 5/1999 | Smith et al. |
| 5,948,470 A | | 9/1999 | Harrison et al. |
| 6,017,773 A | | 1/2000 | Fauchet et al. |
| 6,039,877 A | * | 3/2000 | Chevallet et al. ............ 210/636 |
| 6,120,875 A | | 9/2000 | Haumont et al. |
| 6,332,914 B1 | | 12/2001 | Lee |
| 6,399,234 B2 | | 6/2002 | Bonk et al. |
| 6,406,605 B1 | | 6/2002 | Moles |
| 6,454,938 B2 | | 9/2002 | Moon et al. |
| 6,517,994 B2 | * | 2/2003 | Watanabe ................. 430/270.1 |
| 6,780,786 B2 | | 8/2004 | Dougherty |
| 6,803,581 B2 | * | 10/2004 | Prince et al. ................. 250/372 |
| 6,811,037 B2 | | 11/2004 | Hintsche |
| 6,899,744 B2 | | 5/2005 | Mundschau |
| 6,946,015 B2 | | 9/2005 | Jorgensen et al. |
| 7,112,287 B2 | | 9/2006 | Yagi et al. |
| 7,141,096 B2 | | 11/2006 | Carboneri et al. |
| 7,282,148 B2 | | 10/2007 | Dalton et al. |
| 7,393,392 B2 | | 7/2008 | Yamaguchi et al. |
| 7,410,531 B2 | | 8/2008 | Edlund et al. |
| 7,425,231 B2 | | 9/2008 | Carolan et al. |
| 7,485,233 B2 | | 2/2009 | Vane et al. |
| 7,662,218 B2 | | 2/2010 | Maeda et al. |
| 2003/0096424 A1 | | 5/2003 | Mao et al. |
| 2003/0100136 A1 | * | 5/2003 | Dougherty ..................... 438/50 |
| 2003/0162399 A1 | | 8/2003 | Singh |
| 2003/0183080 A1 | | 10/2003 | Mundschau |
| 2003/0205138 A1 | | 11/2003 | Edlund et al. |
| 2003/0217966 A1 | | 11/2003 | Tapsak et al. |
| 2003/0222012 A1 | | 12/2003 | Lee et al. |
| 2003/0222015 A1 | | 12/2003 | Oyama et al. |
| 2004/0035782 A1 | | 2/2004 | Muller |
| 2004/0063322 A1 | | 4/2004 | Yang |
| 2004/0129135 A1 | | 7/2004 | Roark et al. |
| 2004/0154641 A1 | | 8/2004 | Montierth |
| 2004/0161369 A1 | * | 8/2004 | Chan et al. ................. 422/82.05 |
| 2004/0187558 A1 | | 9/2004 | Dye et al. |
| 2004/0244591 A1 | | 12/2004 | Edlund et al. |
| 2004/0245191 A1 | | 12/2004 | Yagi et al. |
| 2005/0082641 A1 | | 4/2005 | Leedy |
| 2005/0084792 A1 | | 4/2005 | Yokoi et al. |
| 2005/0092676 A1 | | 5/2005 | Dalton et al. |
| 2005/0188843 A1 | | 9/2005 | Edlund et al. |
| 2005/0229786 A1 | | 10/2005 | Wetzig |
| 2005/0241477 A1 | | 11/2005 | Mundschau et al. |
| 2005/0242022 A1 | | 11/2005 | Kang et al. |
| 2005/0268782 A1 | | 12/2005 | Kulkarni et al. |
| 2005/0284814 A1 | | 12/2005 | Mairal et al. |
| 2006/0012086 A1 | | 1/2006 | Munch-Laursen et al. |
| 2006/0016332 A1 | | 1/2006 | Ma et al. |
| 2006/0049101 A1 | | 3/2006 | Suib et al. |
| 2006/0108714 A1 | | 5/2006 | Pedersen et al. |
| 2006/0173259 A1 | | 8/2006 | Flaherty et al. |
| 2006/0175249 A1 | | 8/2006 | Vane et al. |
| 2006/0213368 A1 | | 9/2006 | Kita et al. |
| 2006/0230937 A1 | | 10/2006 | Smirnov et al. |
| 2006/0231484 A1 | | 10/2006 | Haring et al. |
| 2006/0231485 A1 | | 10/2006 | Yoshinaga et al. |
| 2006/0237360 A1 | | 10/2006 | Mizuno et al. |
| 2006/0243655 A1 | * | 11/2006 | Striemer et al. ............ 210/490 |
| 2006/0273004 A1 | | 12/2006 | Kang et al. |
| 2006/0289351 A1 | | 12/2006 | Xiao et al. |
| 2007/0029256 A1 | | 2/2007 | Nakano et al. |
| 2007/0039471 A1 | | 2/2007 | Hofmann |
| 2007/0079703 A1 | | 4/2007 | Carolan et al. |
| 2007/0163437 A1 | | 7/2007 | Ikeda et al. |
| 2008/0178736 A1 | | 7/2008 | Carolan et al. |
| 2008/0245735 A1 | | 10/2008 | Hennige et al. |

FOREIGN PATENT DOCUMENTS

| | | |
|---|---|---|
| EP | 1611941 A2 | 4/2006 |
| WO | 2005/007276 A1 | 1/2005 |

OTHER PUBLICATIONS

Lutzen et al., Structural characterization of ultrathin Si films, J. Vac. Sci. Technol. B 16(5) (1998).*

Chen et al., "Large On-Off Ratios and Negative Differential Resistance in a Molecular Electronic Device," Science 286:1550-1552 (1999).

Jirage et al., "Nanotubule-Based Molecular-Filtration Membranes," Science 278:655-658 (1997).

Kuo et al., "Hybrid Three-Dimensional Nanofluidic/Microfluidic Devices Using Molecular Gates," Sensors and Actuators A 102:223-233 (2003).

Létant et al., "Functionalized Silicon Membranes for Selective Bio-Organism Capture," Nat. Mater. 2:391-395 (2003).

Li et al., "Ion-Beam Sculpting at Nanometre Length Scales," Nature 412:166-169 (2001).

Schmuhl et al., "Si-Compatible Ion Selective Oxide Interconnects with High Tunability," Adv. Mater. 16(11):900-904 (2004).

Storm et al., "Fabrication of Solid-State Nanopores with Single-Nanometre Precision," Nat. Mater. 2:537-540 (2003).

Tong et al., "Silicon Nitride Nanosieve Membrane," Nano Lett. 4(2):283-287 (2004).

Ko et al., "A Polymer-based Microfluidic Device for Immunosensing Biochips," Lab Chip 3:106-113 (2003).

Környei et al., "Humoral and Contact Interactions in Astroglia/Stem Cell Co-cultures in the Course of Glia-Induced Neurogenesis," GLIA 49:430-444 (2005).

Lee et al., "Antibody-Based Bio-Nanotube Membranes for Enantiomeric Drug Separations," Science 296:2198-2200 (2002).

Létant et al., "Functionalized Silicon Membranes for Selective Bio-organism Capture," Nat. Mater. 2:391-395, suppl'y inform. 1 (2003).

Liao et al., "Use of Electrochemical DNA Biosensors for Rapid Molecular Identification of Uropathogens in Clinical Urine Specimens," J. Clin. Microbiol. 44(2) 561-570 (2006).

Midwood et al., "Easy and Efficient Bonding of Biomolecules to an Oxide Surface of Silicon," Langmuir 20:5501-5505 (2004).

Ma et al., "An Endothelial and Astrocyte Co-culture Model of the Blood-brain Barrier Utilizing an Ultra-thin, Nanofabricated Silicon Nitride Membrane," Lab Chip 5:74-85 (2005).

Storm et al., "Fabrication of Solid-state Nanopores with Single-nanometre Precision," Nat. Mater. 2:537-540 (2003) with online supplemental information attached.

Striemer, "Applications of Silicon Nanostructures Compatible with Existing Manufacturing Technology," University of Rochester, Department of Electrical and Computer Engineering 1-136 (2004).

European Search Report for corresponding EP application 06752058.5 (Aug. 19, 2009).

Reisman et al., "The Controlled Etching of Silicon in Catalyzed Ethylenediamine-Pyrocatechol-Water Solutions," J Electrochem. Soc. 126(8):1406-1415 (1979).

Grom et al., "Ordering and Self-Organization in Nanocrystalline Silicon," Nature 407:358-361 (2000).

Office Action dated Apr. 29, 2009 in U.S. Appl. No. 11/415,014.

European Examination Report for corresponding EP application 06752058.5 (dated Jan. 29, 2010).

Office action dated Jul. 23, 2010 for U.S. Appl. No. 11/415,014.

Yoon et al., "Covalent Crosslinking of 1-D Photonic Crystals of Microporous Si by Hydrosilylation and Ring-opening Metathesis Polymerization," Chem. Commun. 680-81 (2003).

Xie et al., "Absorption and Luminescence Studies of Free-standing Porous Silicon Films," Phys. Rev. B 49 (8):5386-5397 (1994).

* cited by examiner

DARK-FIELD (DIFFRACTION)

BRIGHT-FIELD (TRANSMISSION)

7 nm THICK 20 nm THICK 50 nm THICK

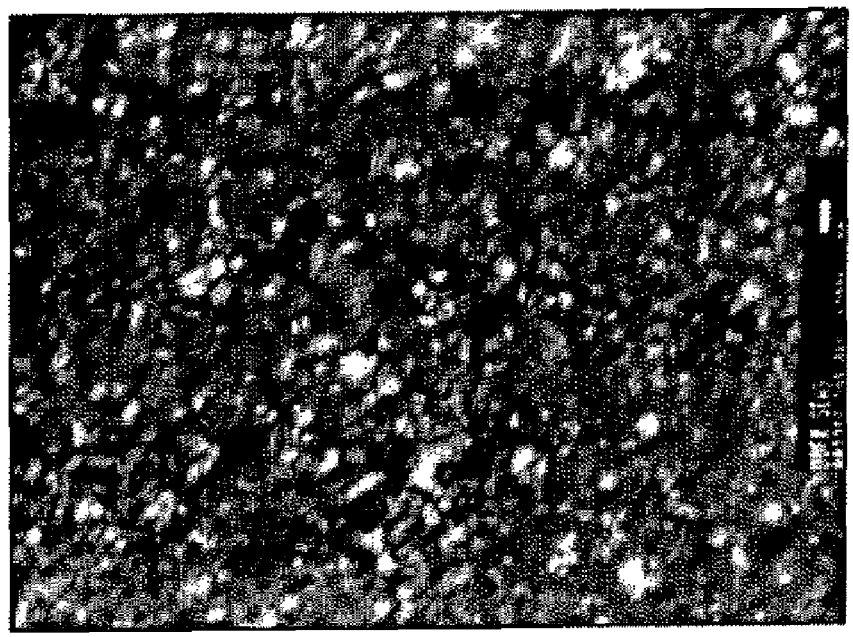
FIG. 14B RTP ONLY
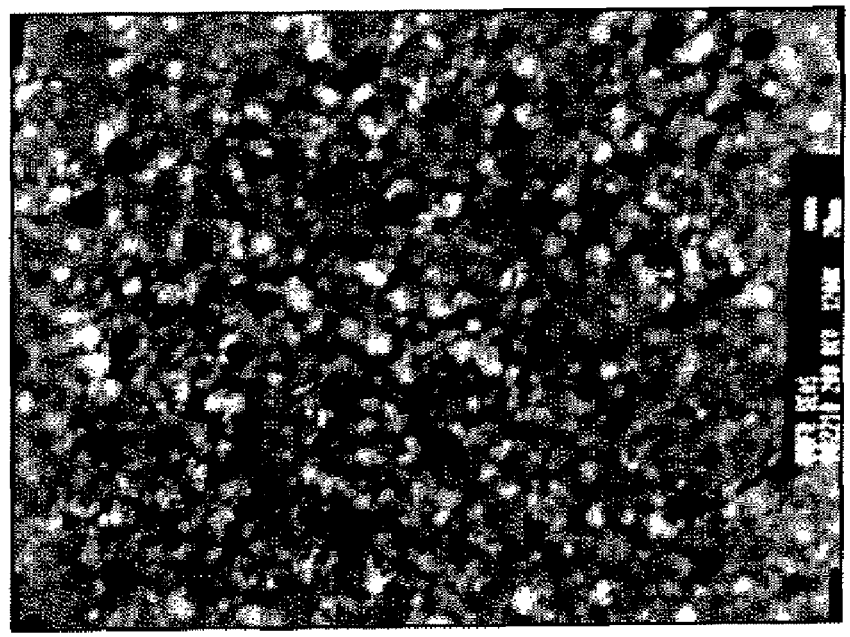
FIG. 14A RTP + FURNACE ANNEAL

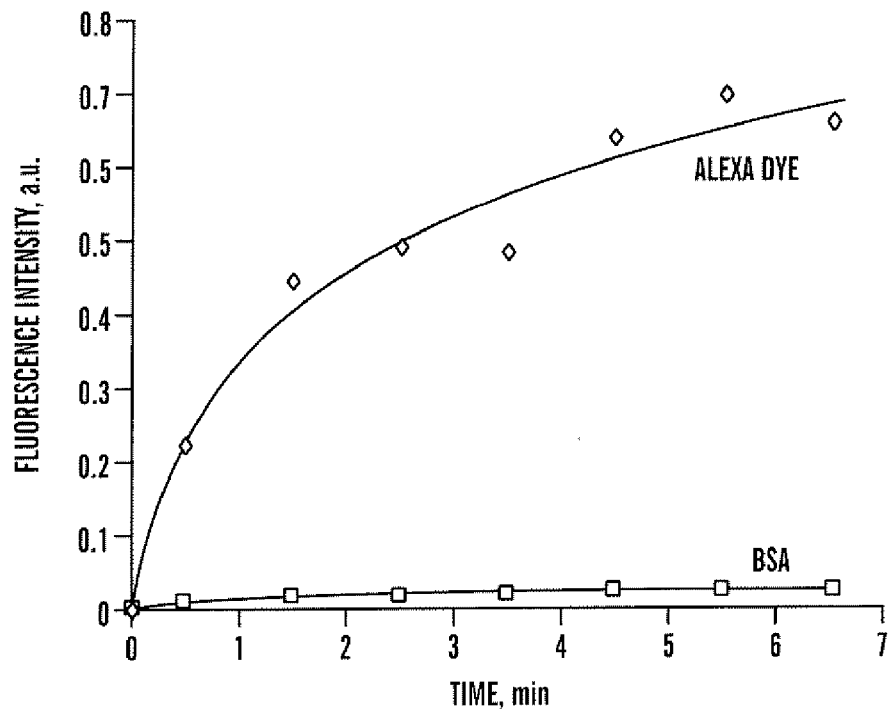
FIG. 17A
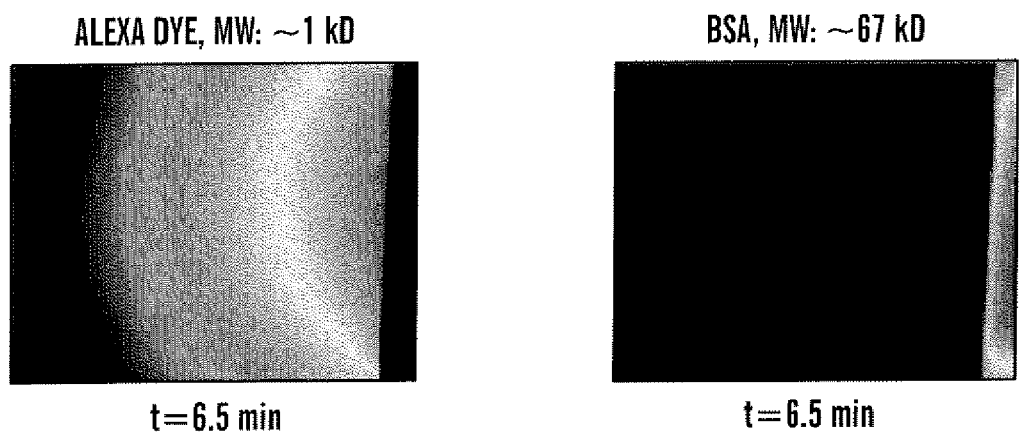
FIG. 17B  FIG. 17C

ULTRATHIN POROUS NANOSCALE MEMBRANES, METHODS OF MAKING, AND USES THEREOF

This application claims the benefit of U.S. Provisional Patent Application Ser. Nos. 60/675,963 and 60/782,001 filed Apr. 29, 2005, and Mar. 14, 2006, respectively, which are hereby incorporated by reference in their entirety.

FIELD OF THE INVENTION

The present invention relates to porous nanoscale membranes, particularly ultrathin porous nanoscale membranes, methods of making the membranes, and uses thereof.

BACKGROUND OF THE INVENTION

The separation of molecules in biological fluids is a basic procedure important in clinical diagnosis and disease treatment, and the most elemental device for solute separation is a porous membrane filter. Thus, a revolutionary advance in filter technology has the potential to impact many areas of human health. Typical filter materials are made as woven matrices of plastic or cellulose polymers. Filters manufactured in this manner naturally contain a wide distribution of pore sizes and the smallest pores will eventually clog with small molecules of the filtrate. The abundance of small pores and large filter thicknesses are the two major sources of resistance to flow across membrane filters (Tong et al., "Silicon Nitride Nanosieve Membrane," Nano Letters 4:283-287 (2004)).

Two types of nanofabricated membranes have been previously developed for molecular separations. In the first type, molecules pass through channels with nanoscale diameters and lengths between 6 µm and 60 µm. Channel-type filters have been assembled by impregnating mesoporous alumina or polycarbonate host membranes with silica (Yamaguchi et al., "Self-assembly Of A Silica-surfactant Nanocomposite In A Porous Alumina Membrane," Nature Materials 3:337-341 (2004)) or gold (Lee et al., "Electromodulated Molecular Transport In Gold-Nanotubule Membranes," J. Am. Chem. Soc. 124:11850-11851 (2002)), and by the selective removal of silicon dioxide ($SiO_2$) from corrugated assemblies of silicon and polysilicon (Martin et al., J. Controlled Release 102: 123-133 (2005)). Channel-type membranes have been used successfully to separate small (~1 nm) molecules from proteins (~5 nm) (Yamaguchi et al., "Self-assembly Of A Silica-surfactant Nanocomposite in a Porous Alumina Membrane," Nature Materials 3:337-341 (2004)), and to slow the diffusion of proteins for drug delivery applications (Martin et al., "Tailoring Width of Microfabricated Nanochannels To Solute Size Can Be Used To Control Diffusion Kinetics," J. Controlled Release 102:123-133 (2005)). While the large thickness of channel-type membranes provides the mechanical stability needed for practical applications and large-scale separations, flow resistance (Tong et al., "Silicon Nitride Nanosieve Membrane," Nano Letters 4:283-287 (2004)) and diffusion time increase directly with membrane thickness. Novel aspects of channel membranes, such as the sub-Fickian movement of molecules constrained to move in single file (Wei et al., "Single-file Diffusion of Colloids in One-Dimensional Channels," Science 287:625-627 (2000)), can be expected to slow flux further. Long channels also create a lag between the initial introduction of a mixture and the appearance of a species at the backside of the membrane. For small macromolecules (~1 nm) this delay can be several hours (Yamaguchi et al., "Self-assembly Of A Silica-surfactant Nanocomposite in a Porous Alumina Membrane," Nature Materials 3:337-341 (2004)). Thus, while the use of channel-type nanomembranes for steady separations is possible, their use in rapid separation procedures seems unlikely.

The issue of transport efficiency is addressed by a second type of nanoporous membrane where the membrane is roughly as thick (~10 nm) as the molecules being separated. As an array of molecularly sized holes in a molecularly-thin plane, this type of membrane achieves a structural limit that can help maximize filtration rates (Tong et al., "Silicon Nitride Nanosieve Membrane," Nano Letters 4:283-287 (2004); Chao et al., "Composite Membranes From Photochemical Synthesis of Ultrathin Polymer Films," Nature 352: 50-52 (1991)). In published work, however, such an ultrathin membrane has been fabricated only by individually drilling 25 nm pores in a 10 nm thick silicon nitride membrane using an ion beam (Tong et al., "Silicon Nitride Nanosieve Membrane," Nano Letters 4:283-287 (2004)). To provide mechanical integrity, this ultrathin membrane was suspended over 5 micron holes patterned in a much thicker underlying membrane. Large scale production of this type of membrane is impractical because the pore drilling procedure is expensive and extremely slow (~20 hours/$cm^2$) (Tong et al., "Silicon Nitride Nanosieve Membrane," Nano Letters 4:283-287 (2004)). This method of manufacture would not lend itself to a commercially useful filtration membrane.

The implementation of microfluidics technology in small-scale protein separation and detection devices would benefit from the development of an electrically switchable nanofluidic filter. Such a filter would allow the construction of purification systems that can be electronically tuned to capture proteins with sizes specified by a user. In the case of a protein that is too dilute for detection or analysis, a dynamic filter could be programmed to first concentrate by trapping the protein as solute flows past, and then release the protein into an analysis chamber. There are several notable examples of switchable filters in the recent literature. In one example the charge on the membrane is actively manipulated to repel like-charged species from entrance into pores (Schmuhl et al., "SI-Compatible Ion Selective Oxide Interconnects with High Tunability," Adv. Mater. 16:900-904 (2004); Martin et al., "Controlling Ion-Transport Selectivity in Gold Nanotubule Membranes," Adv. Mater. 13:1351-1362 (2001)). In other examples, an electro-osmotic flow is established that drives solute charges past the membrane (Kuo et al., "Molecular Transport through Nanoporous Membranes," Langmuir 17:6298-6303 (2001)). These filters were made by composite assembly procedures that would be costly to integrate into a mass production. The resulting filters are also thick, requiring species to pass through micron-long channels before emerging as filtrate. Large filter thicknesses are a major sources of resistance to flow-across membrane filters (Tong et al., "Silicon Nitride Nanosieve Membrane," Nano Letters 4:283-287 (2004), and precludes the use of these designs in rapid separation applications.

The present invention is directed to overcoming these and other deficiencies in the art.

SUMMARY OF THE INVENTION

A first aspect of the present invention relates to a method of producing a porous nanoscale membrane. This method includes the following steps: applying a nanoscale film to one side of a substrate, the nanoscale film comprising a semiconductor material; masking an opposite side of the substrate; etching the substrate, beginning from the masked opposite side of the substrate and continuing until a passage is formed through the substrate, thereby exposing the film on both sides thereof to form a membrane; and simultaneously forming a plurality of spaced pores in the membrane.

A second aspect of the present invention relates to a nanoporous semiconductor membrane exposed on opposite sides thereof and having an average thickness of less than 500 nm, wherein said nanoporous membrane is prepared according to a process according to the first aspect of the present invention A third aspect of the present invention relates to a nanoscale semiconductor membrane exposed on opposite sides thereof, having an average thickness of less than about 500 nm, and having a plurality of pores extending between the opposite sides thereof, wherein one or both of the opposite sides are substantially smooth.

A fourth aspect of the present invention relates to a filter device including at least one nanoscale membrane according to the second or third aspects of the present invention. The filter device preferably includes a support having a passage extending between opposite surfaces of the support, wherein the at least one nanoscale membrane is bound to or positioned on the support, with the at least one nanoscale membrane confronting the passage.

A fifth aspect of the present invention relates to a microfluidic flow device that includes the filter device according to the fourth aspect of the present invention.

A sixth aspect of the present invention relates to a dialysis machine that includes a filter device according to the fourth aspect of the present invention. The dialysis machine preferably contains multiple filter devices of the present invention, each having a plurality of the membranes.

A seventh aspect of the present invention relates to a method of filtering nanoscale products. This method includes the steps of: providing at least one nanoscale membrane according to the second or third aspects of the present invention; and passing a fluid, containing one or more products to be filtered, through the at least one nanoscale membrane, whereby objects larger than the maximum pore size are effectively precluded from passing through pores of the at least one nanoscale membrane.

An eighth aspect of the present invention relates to a device for carrying out a biological reaction that includes: a substrate having one or more wells, each having a bottom and one or more sidewalls, wherein the bottom includes a nanoscale semiconductor membrane having an average thickness of less than about 500 nm, and having a plurality of pores extending between the opposite sides thereof; and a biological reaction medium in the one or more wells, and two or more reactants individually selected from the group of compounds and organisms.

A ninth aspect of the present invention relates to a method of performing a biological reaction. This method includes the steps of: providing a device according to the eighth aspect of the present invention; carrying out the biological reaction in the one or more wells, thereby forming an end product; and passing spent biological reaction medium from the one or more wells through the nanoscale membrane, wherein the end product is either passed through the nanoscale membrane or retained in the one or more wells.

A tenth aspect of the present invention relates to a method of screening an agent for its activity on a cell. The method includes the steps of: providing an agent; performing a method according to the ninth aspect of the present invention by introducing the agent into the biological reaction medium that contains the cell; and analyzing the cell or the end product to identify the activity of the agent on the cell.

An eleventh aspect of the present invention relates to a fuel cell that includes at least one membrane according to the second or third aspects of the present invention. A fuel cell of this type preferably includes a membrane that selectively passes positively charged ions.

The method of producing ultrathin nanoscale membranes of the present invention achieves a reproducible and cost-effective approach for the production of membranes that will be commercially useful in filtration, electron microscopy, nanobioreactor applications, and fuel cells. In particular, because the semiconductor materials are rendered porous in a step that allows all pores simultaneously to form during the annealing process, the pore density and size can be controlled by manipulating the annealing conditions and the thickness of the deposited semiconductor material. Moreover, because of the use of sacrificial layers on one or both sides of the semiconductor film that is to form the final membrane, it is possible to prepare membranes with substantially smooth surfaces. This type of local smoothness is a useful feature for filters to be used in many filtering applications.

Although the etching process takes 6 hours for a 500 nm thick silicon wafer, the etching process does not need to be continually monitored and, therefore, is not time consuming. The process could very easily be automated. Because the technique etches to a planar etch stop (at the substrate/first sacrificial film interface), fields of view approaching 5,000× 5,000 $\mu m^2$ of uniform thickness can be produced, which are orders of magnitude larger than the viewable area produced with other techniques. Perhaps the most unique feature of this process is its considerable parallelism, producing up to several hundred porous nanoscale membranes in a single etching step. With other methods described in the literature, a researcher could easily spend a full day preparing just a few samples, and these processes require full attention.

BRIEF DESCRIPTION OF THE DRAWINGS

FIG. 8A illustrates a plan view, and FIG. 8B illustrates a side elevational view.

FIG. 9A shows refractive index dispersion curves of high optical density silicon films before (b, 15 nm a-Si) and after (a, 15 nm nc-Si) crystallization (729° C., 30 second anneal), determined by spectroscopic ellipsometry. Dispersion curves for crystalline silicon (d, Crystalline Si) and CVD grown a-Si (c, CVD a-Si reference) are also plotted for reference. FIG. 9B is an AFM scan over the edge of a membrane transferred to a polished quartz window, which confirms the 15 nm thickness and minimal roughness of a pnc-Si membrane. FIGS. 9C-D are optical micrographs of a 15 nm thick pnc-Si membrane at equilibrium, i.e., 0.0 pounds per square inch ("psi"), and with 15.0 psi of back pressure, demonstrating the remarkable strength of the ultrathin membrane material.

FIG. 10A is an interference contrast optical micrograph of the released 3-layer 7 nm membrane (which shows similar structure to a homogeneous oxide membrane). FIG. 10B illustrates that dissolution of the oxide layers in buffered oxide etchant yields a substantially flat 7 nm nc-Si membrane. FIG. 10C is an interference contrast optical micrograph of the planar 7 nm nc-Si membrane formed upon dissolution of the oxide layers in buffered oxide etchant. The flatness of this membrane was measured to be less than 10 nm, and the roughness was less than 0.5 nm across a similar 200 μm membrane. FIG. 10D is a plan view dark field TEM image of the 7 nm nc-Si film. Only those crystals with the proper crystalline orientation to support electron diffraction appear in this image. FIG. 10E shows a 3 nm thick 400 μm wide membrane.

FIGS. 14A-B are plan view TEM images of 7 nm thick nc-Si films deposited with the optimized a-Si sputtering conditions. The dark spots in the images are holes in the film. Considerably more holes appear in the film that was both rapid thermal annealed ("RTA" or "RTP") and furnace annealed.

(FIG. 15A) to 729° C. (FIG. 15B) to 753° C. (FIG. 15C), as illustrated in the histograms that plot total pore area (left plot) and total number of pores (right plot) available for molecular transport at each pore diameter. The TEM image used to generate each histogram is included on the center of the figure.

FIGS. 17A-C show that using a membrane according to FIG. 15A, i.e., Membrane A, highly efficient separation of BSA and free dye was observed through a membrane over 6.5 minutes. A plot of the fluorescence intensity 50 microns from the membrane edge was generated from a time series of images (FIG. 17A). Intensities were normalized to the center value of the membrane in the first frame for each channel. The final fluorescence image of each channel is shown in FIGS. 17B-C.

FIG. 20A shows the separation of dye and BSA using the membrane of FIG. 15A. FIG. 20B shows the separation of BSA and IgG using the membrane of FIG. 15B. FIG. 20C shows the separation of IgG and IgM using the membrane of FIG. 15C.

DETAILED DESCRIPTION OF THE INVENTION

The present invention is directed to ultrathin nanoscale membranes, methods of making those membranes, and their use in macromolecular filtration applications, nanobioreactors, and as a support for materials during electron microscopy.

According to one aspect of the present invention, the invention relates to a method of making porous nanoscale semiconductor membrane.

The semiconductor material used to prepare the membrane can be any suitable semiconductor material or combinations thereof, whether mixed as alloys or prepared as multilayered structures. Suitable semiconductor materials include, without limitation, undoped silicon or germanium, p-doped silicon or germanium, n-doped silicon or germanium, or a silicon-germanium alloy. Exemplary p-doped silicon or germanium include, without limitation, those containing $(CH_3)_2Zn$, $(C_2H_5)_2Zn$, $(C_2H_5)_2Be$, $(CH_3)_2Cd$, $(C_2H_5)_2Mg$, B, Al, Ga, and In dopants. Exemplary n-doped silicon or germanium include, without limitation, those containing $H_2Se$, $H_2S$, $CH_3Sn$, $(C_2H_5)_3S$, $SiH_4$, $Si_2H_6$, P, As, and Sb dopants. The dopants can be present in any suitable amount. Exemplary alloys of these materials include, silicon and germanium alloys in amounts of up to about 10% by weight of germanium, as well as mixtures of these materials, and semiconductor materials based on Group III element nitrides.

These semiconductor materials are preferred, because they are believed to behave in the same manner as undoped silicon with regard to their ability to crystallize. Thus, an amorphous film of a semiconductor material can be crystallized, as described below, to form a nanocrystalline or polycrystalline membrane that is characterized by pores that pass through the nanoscale membrane. It should be appreciated by those of skill in the art that any other materials that possess an intrinsic capability of crystallizing in this manner can likewise be used to form a porous nanoscale membrane of the present invention.

The method of preparing the membrane generally involves the steps of applying a nanoscale film to one side of a substrate, where the nanoscale film is formed of a semiconductor material as described above and also masking an opposite side of the substrate. These steps can be performed in either order. After masking and applying the nanoscale film, the substrate is etched, beginning from the masked opposite side of the substrate and continuing until a passage is formed through the substrate, thereby exposing the film on both sides thereof to form a membrane. The nanoscale film is rendered porous by annealing in a manner that achieves simultaneous formation of a plurality of randomly spaced pores in the film or membrane.

Figure 1:
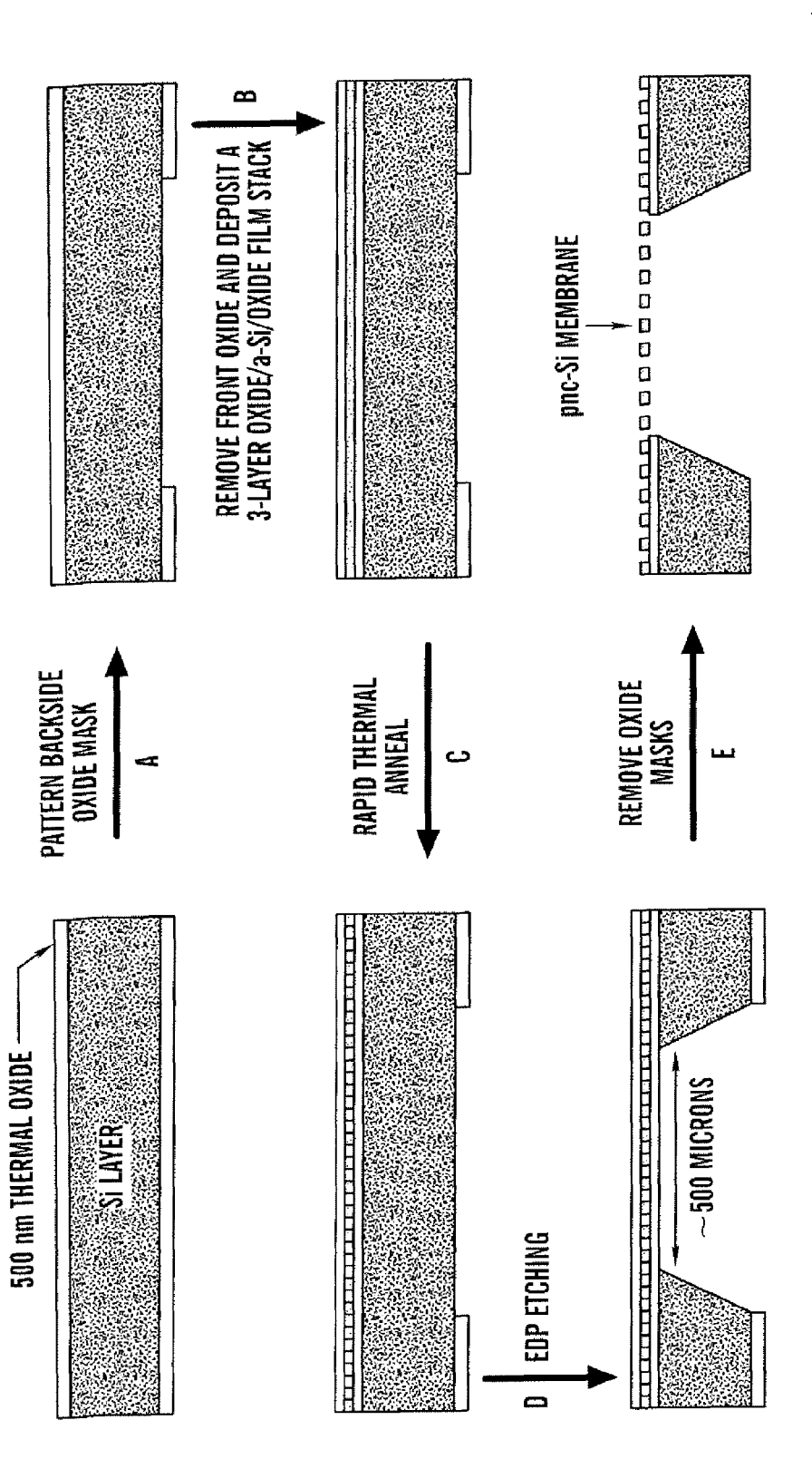
FIG. 1 schematically illustrates one embodiment of making a porous nanoscale semiconductor membrane of the present invention. References to silicon and the crystal structure of the silicon are by way of example only.

These steps are described in greater detail in association with the schematic illustration of FIG. 1. (Although FIG. 1 refers to amorphous silicon and nanocrystalline silicon, consistent with the above discussion of semiconductors, it should be appreciated that such references are by way of example only.)

The substrate to be used to support the nanoscale membranes is preferably a substrate that can be easily masked and etched so that a membrane can be formed. Silicon is a preferred example of one such substrate. Using standard 4, 6, 8, or 12 inch silicon wafers as the support, upwards of about 1500, 500 μm×500 μm, of the nanoscale membranes can be formed on its surface depending on the desired linear area to be occupied by the membrane. Using silicon as the example, silicon contains a naturally occurring thermal oxide layer. To simplify the procedures used in preparing and forming the films of the present invention, this thermal oxide layer is preferably removed entirely from one side of the substrate and partially removed (i.e., during the masking procedure) from the opposite side of the substrate, in both instances using a buffered oxide etchant ("BOE") such as, but not limited to, "buffer HF improved" etchant (Transene Company Inc., Danvers Mass.). This is illustrated in Steps A and B, respectively, of FIG. 1.

Figure 2:
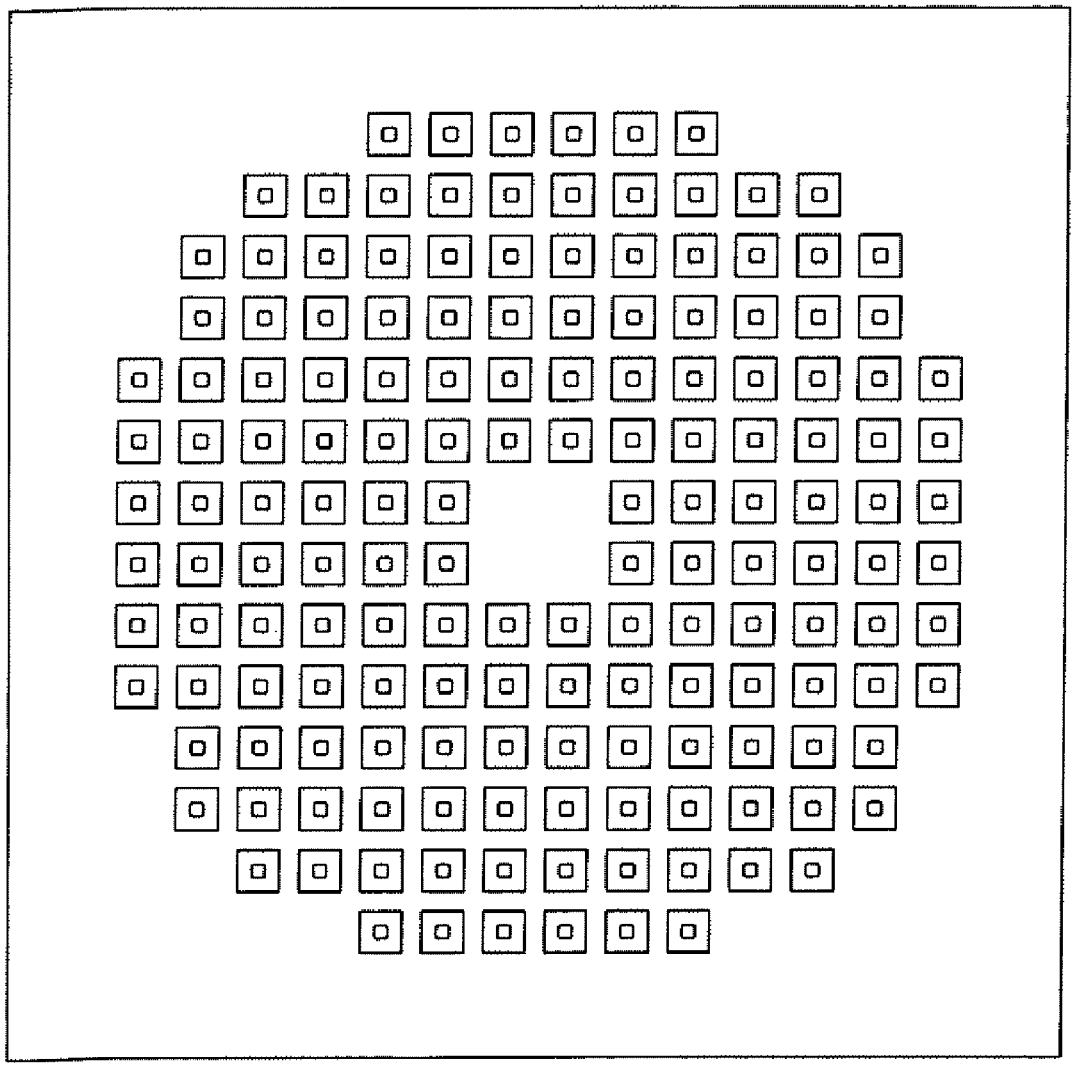
FIG. 2 illustrates the backside masking of elements so as to facilitate formation of an etched passage through the substrate (i.e., to expose the membrane) as well as a trench in the substrate to allow for removal of an individual membrane. The masking patterns show variation across the substrate, as different membrane sizes were optimized. All of the masks can be made substantially the same.

The masking step is preferably performed by forming an array of elements that will dictate the manner in which the unprotected substrate will be etched. According to one embodiment, illustrated in FIG. 2, each element is composed of a square hole surrounded by a square outline. This allowed the formation of membrane structures, and also cut a trench around each membrane so that samples could be individually removed from the wafer. Other configurations can, of course, be utilized without departing from the scope of the invention. When the feature sizes on the mask are fairly large, they can be printed directly on film using a high quality laser printer. A film of this sort can be mounted on a glass mask blank and used as a standard photolithography mask. The backside $SiO_2$ can be patterned with standard photolithography, followed by an ~10 min soak in 4:1 BOE to transfer the pattern into the oxide layer. The photoresist can be removed with acetone.

To the side of the substrate that lacks the oxide layer, a film of the semiconductor material is applied to the substrate. In a preferred embodiment, the semiconductor film is preferably applied between applications of sacrificial oxide films (i.e., one sacrificial film applied to the substrate, and the other sacrificial film applied to the semiconductor film, thereby sandwiching the semiconductor film).

The sacrificial oxide films can be applied to form any desired relief pattern in the semiconductor film, or the oxide and semiconductor films can be applied in a manner that achieves substantially planar films that have little variation in thickness or surface roughness (i.e., the films are locally smooth). Relief patterns can be formed by, e.g., etching the front face of the substrate prior to application of the sacrificial film.

Preferably, the oxide film is one that is etched at a rate that is at least an order of magnitude, more preferably two orders of magnitude less than the rate at which the substrate is etched by a particular etchant. This allows for precise control of the etching process; essentially, the etching process comes to a halt once the sacrificial oxide layer is encountered. This is illustrated in Step D of FIG. 1.

Any oxide film that resists etching (under conditions that are used to etch the substrate) can be used as the sacrificial film. Exemplary oxide films include, without limitation, silicon dioxide, titanium oxide, tin oxide, aluminum oxide, zinc oxide, hafnium oxide, and tantalum oxide. Based on testing of oxide membranes alone, it was expected that a 10 nm film of sputtered oxide would be sufficient to protect the nc-semiconductor layers from the etchant, although such membranes cannot mechanically support themselves alone. To build in additional tolerance, however, 20 nm sacrificial oxide films became standard for all nc-Si membrane fabrication and transmission electron microscopy imaging experiments as described in the Examples.

Application of the oxide films and semiconductor films can be carried out using any approach that allows for control of the film thickness. Exemplary approaches include, without limitation, radio-frequency ("RF") magnetron sputtering, low pressure chemical vapor deposition ("CVD"), plasma enhanced CVD, thermal chemical growth, RF sputtering, DC sputtering, thermal evaporation, electron beam evaporation, and electroplating. Of these, RF magnetron sputtering and electron beam evaporation are preferred. The conditions employed during the film application steps can be selected according to the desired film composition and thickness, as is known by those of skill in the art. The conditions employed during the application can also be altered during the course of the application step, thereby achieving strata within the films that have varying properties. Exemplary condition changes include, without limitation, pressure changes, plasma density changes, plasma power changes, temperature changes, gas composition changes, and source material changes.

With regard to the application of silicon dioxide and amorphous silicon films, the use of a high quality variable angle spectroscopic ellipsometer (VASE) and a full wafer compatible atomic force microscope (AFM) allowed for reproducible and stable characterization of the films to be performed. This allowed for optimization of the conditions utilized with RF sputtering procedures that were employed in the Examples described herein. Basically, $SiO_2$ films were reliably prepared at 750 W RF power, 15 mTorr chamber pressure, 6.0 sccm argon flow, and 7.6 sc cm oxygen flow, where the films exhibit very low rms roughness (at most about 0.27 nm) and film thickness is dictated by the deposition time. Amorphous silicon films were prepared at 150 W RF power, 15 mTorr chamber pressure, and 10.0 sccm argon flow. As with the oxide films, the deposited thickness of a-Si was found to be a linear function of time. The use of other oxide films and other semiconductor films can be optimized for the particular equipment that is employed.

Films that lack an intentional relief pattern are described herein as being substantially smooth or locally smooth. These terms are both used to refer to the planar nature of the film surface(s), which is indicated by a surface roughness of less than about 1 nm, preferably less than about 0.5 nm, most preferably less than about 0.4 nm, 0.3 nm, or 0.2 nm.

The porous nanoscale semiconductor membranes of the present invention can be prepared in any desired submicron thickness, but preferably less than 500 nm. In some embodiments, where the membranes are used in pressurized environments, porous semiconductor membranes of between about 100 to about 500 nm, or about 150 to about 400 nm, or about 150 to about 250 nm are preferred. In other embodiments, where the membranes are used in low pressurized environments or non-pressurized environments, the membranes can be less than about 100 nm, more preferably less than about 90 nm, about 80 nm, about 70 nm, or about 60 nm, even more preferably less than about 50 nm, about 40 nm, about 30 nm, or about 20 nm. In some embodiments, membranes of between about 2 to about 25 nm are preferred. Particularly preferred are membranes that are less than about 10 nm thick, including those than are between about 1 nm to about 9 nm, about 2 nm to about 8 nm, about 2 nm to about 5 nm, and about 6 nm and about 10 nm thick. Porosity and pore sizes of these membranes are described hereinafter.

Regardless of the materials selected, once the films have been formed, the semiconductor film is preferably annealed prior to any etching procedures. This is illustrated in Step C of FIG. 1. Annealing can be performed after etching in some circumstances, particularly where the etch process removes only a limited amount of the total mass of the substrate. In other words, where the integrity of the etched substrate will not be altered during annealing, annealing of the semiconductor membrane (the released multilayered film) can be carried out after etching. Otherwise, the annealing is preferably performed on the semiconductor film prior to etching so as to minimize strain applied to the membrane.

The annealing process can be carried out using known procedures for annealing semiconductor materials. Basically, these annealing processes afford sufficient heating of the semiconductor and sufficient dwell time (i.e., temperature and duration) so as to foster crystal growth. Preferably the annealing is performed in a manner that achieves substantially uniform crystal growth, where the average crystal sizes are in the nanometer range, more preferably less than about 100 nm, about 90 nm, or about 80 nm in size, even more preferably less than about 70 nm or about 60 nm or about 50 nm in size, most preferably less than about 40 nm, about 30 nm, about 20 nm, about 10 nm, or even as low as about 2 nm in size.

Suitable annealing processes include, without limitation, furnace annealing, rapid thermal annealing ("RTA"), laser annealing, and combinations thereof. Excellent results have been obtained with RTA alone or in combination with furnace annealing. With respect to the conversion of amorphous undoped silicon to form a crystalline (i.e., nanocrystalline) silicon, preferred temperature ranges are between about 650° C. and about 900° C., more preferably about 715° C. and about 800° C.; and preferred annealing durations are between about 20 seconds and about 2 minutes for RTA, or between about 15 minutes and about 2 hours for furnace annealing. Conditions for doped silicon and silicon alloys will vary slightly. Conditions for germanium will be from about 450° C. to about 900° C., more preferably about 500° C. to about 700° C., using similar times for RTA and furnace annealing. The annealing temperature and duration is also limited by the selection of the substrate upon which the films are formed; the temperature and duration should be selected to avoid deformation of the substrate.

Any suitable etching solution that, as noted above, selectively etches the substrate over the sacrificial oxide films can be employed. While one, two, or three orders of magnitude difference in selectivity is suitable, a preferred etchant has approximately four orders of magnitude ($10^4$) difference in selectivity between silicon/silicon dioxide. This preferred etchant, known as EDP, contains ethylenediamine, pyrocatechol, pyrazine, and water. This etchant has an $SiO_2$ etch rate of only 0.2 nm/min, with a corresponding (100) silicon etch rate of about 1400 nm/min. Other advantages of EDP is that it contains no metal ions (such as potassium or sodium) that create serious contamination issues in cleanroom facilities, and this etchant solution is also known to produce fewer hydrogen bubbles during etching, leading to a smoother etch front.

One preferred form of the EDP solution is commercially available from Transene Company, Inc. (Danvers, Mass.) under the label PSE300F (i.e., "Preferential Silicon Etch 300—Fast"). This solution contains 1 L ethylenediamine, 320 g pyrocatechol, 320 mL water, and 6 g pyrazine.

Because EDP requires about 6 hours to etch through the substrate, and EDP would otherwise have consumed the thin sputtered films on the front surface if exposed to EDP for the full 6 hours, an etch cell was created that allows for submersion of the backside (i.e., masked side) of the substrate while allowing the film-deposited side of the wafer to remain unexposed to the etchant. This therefore avoids the need for thick oxide masks, which would have been required for submersion of the entire wafer in the etch cell.

Figure 3:
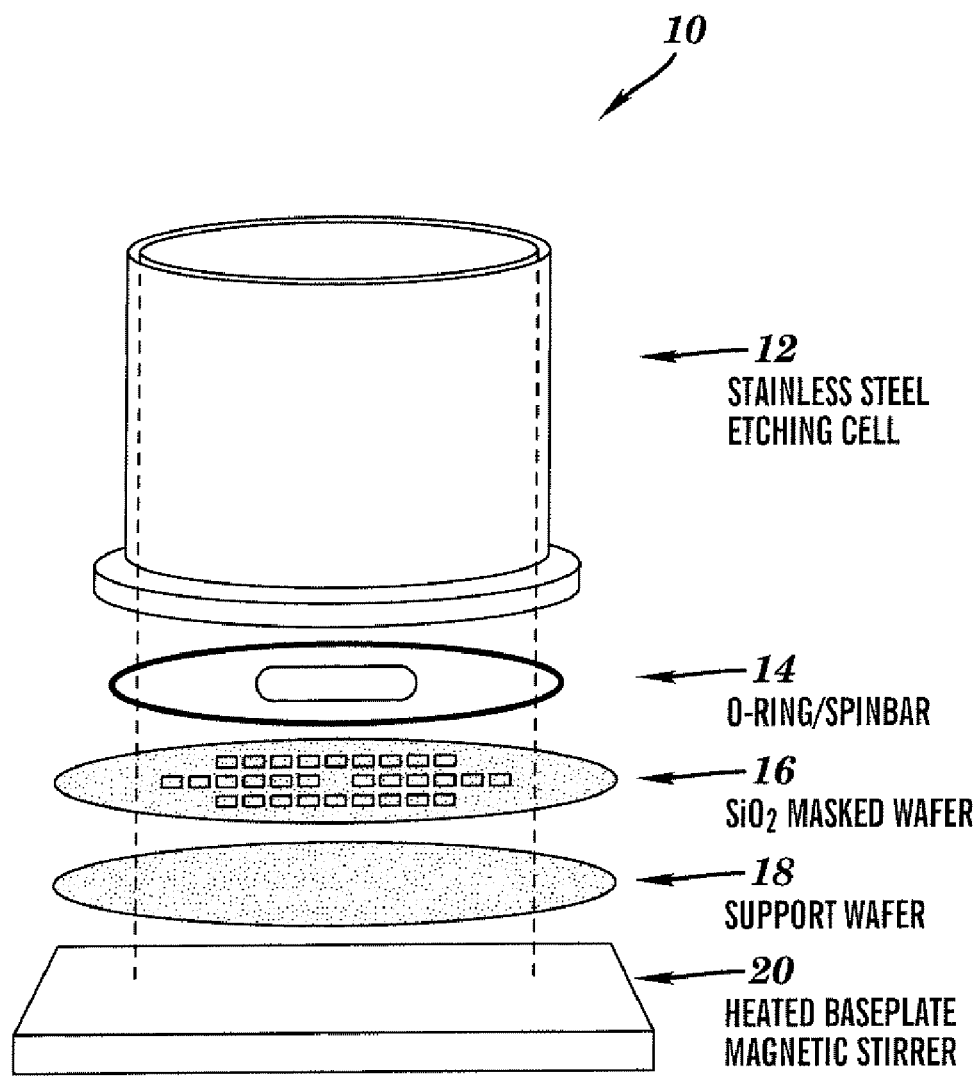
FIG. 3 illustrates a single surface etching cell used to ensure that etchant is only exposed to the backside of the wafer. The solution is heated indirectly through the baseplate (shown) or through the sidewall, and the temperature is controlled using feedback from a thermocouple submerged in the solution (i.e., inside the etching cell).

As noted above, the etching process is carried out beginning from the backside (i.e., masked side) of the substrate. This process is illustrated in Step D of FIG. 1. This process is preferably carried out in a etch cell 10 of the type illustrated in FIG. 3. Basically, a stainless steel cylinder collar 12 is sealed over the backside of the masked substrate (i.e., masked Si wafer 16) using a nitrile O-ring 14 mounted in a groove at the base of the cylinder. The O-ring allows a tight seal to be formed against the wafer to be etched. A support wafer 18 provides a planar support surface to the membranes when they are released from the substrate (i.e., when etching of the substrate is completed). The etching solution can be heated through the baseplate 20 (or through the sidewalls of the etching cell) with, e.g., an electrical resistance heater, and a stable solution temperature can be maintained with feedback from a thermocouple. Magnetic stirring can also applied through the baseplate, ensuring adequate mixing of the etchant. A condenser (not shown) mounted to the top of the cell can be used to prevent excessive evaporation during the ~6 hour etches. Using an etch cell of this type requires only ~250 mL of EDP for a standard 4 inch silicon wafer. This allows fresh solution to be used for every etch, promoting reproducibility.

Although there are several ways to design a tool that etches only a single surface of a semiconductor wafer, the above-described design has the advantage of making very efficient use of the etching solution. The 250 mL used for each etch is near its silicon saturation limit and can be discarded after each use. Other techniques may involve protecting one side of the wafer and submerging it in a much larger volume EDP bath. A larger volume is not usually disposed of after each etch, due to expense, and therefore each successive etch will see a solution with different properties.

Following etching, all that remains across the expanse of the etched pit is the sacrificial film-protected membrane. This membrane is exposed on both sides, but at this stage it is not porous due to the presence of the non-porous sacrificial films. In a final step, the sacrificial films are removed from both sides of the crystalline (nanoporous) semiconductor nanoscale film. Removal of the sacrificial oxide films is carried out using an etchant that selectively etches oxide films over the semiconductor film/membrane. Suitable etchants include, without limitation, buffered oxide etchant solutions and hydrofluoric acid etchant solutions. Exemplary buffered oxide etchant solutions include, without limitation, about 6 to about 25 wt % (more preferably about 6 to about 10 wt %) HF (BOE contains HF and ammonium fluoride—concentrations vary by manufacturer). Exemplary hydrofluoric acid solutions include about 5 to about 25 wt % HF, more preferably about 5-15 wt % HF.

Conditions employed for removal of the sacrificial oxide films include dipping the etched substrate in an appropriate etchant solution for sufficient amount of time to cause the oxide films to be substantially removed from the underlying porous semiconductor nanoscale film. Typical times for a 20 nm oxide film, at an oxide etchant temperature of about 22° C., include between about 10 sec and about 8 minutes.

Upon removal of the sacrificial oxide films, the resulting porous nanoscale membrane is exposed on its opposite sides. Individual membranes can be removed from the larger wafer given the masking pattern utilized (described above). Alternatively, a whole wafer can be maintained with a plurality of the membranes formed thereon.

The porous nanoscale membranes have thicknesses within the ranges described above. Depending upon the annealing conditions that are employed, the porosity and average pore sizes (including maximum pore size) can be controlled. By way of example, membranes having average pore sizes of less than about 50 nm in diameter can be prepared. More particularly, membranes can be prepared so as to tailor average pore sizes within the range of about 25 to about 50 nm, about 20 to about 25 nm, about 15 to about 20 nm, about 10 to about 15 nm, and about 2 to about 10 nm. Pore densities between $10^6$-$10^{12}$ cm$^{-2}$ can be obtained.

Additional control over the pore size distribution can be achieved by slowly reducing the size of the as-formed pores by filling them in with another material. For example, the RF magnetron sputtering process for depositing amorphous silicon could be applied to the nanoporous membrane. Depositing approximately 1 nm of amorphous silicon could reduce the average pore diameter by as much as 2 nm. By carefully controlling this subsequent deposition, pore size distribution much smaller than those that can be formed directly, can be achieved.

The membranes are also characterized by a large surface area not previously obtained for semiconductor membranes. In particular, surface areas up to about 10 mm$^2$ have been obtained. In addition, membranes having lateral length to thickness aspect ratios greater than 10,000:1 have been obtained. In certain embodiments, aspect ratios greater than 50,000:1, 100,000:1, and 430,000:1 have been obtained. Given the stability of the films and the manufacturing procedures, it is expected that aspect ratios of up to 1,000,000:1 can be achieved.

In one embodiment, the nanoscale membrane is formed of a semiconductor material and further includes a coating of a metal at least partially covering one side of the membrane. Metals can be partially coated onto the membrane using DC or RF sputtering, thermal evaporation, electron beam evaporation, electroplating, or wet chemical deposition. Suitable metals include, without limitation, gold, silver, copper, platinum, aluminum, chromium, titanium, tungsten, lead, tin, palladium, and alloys of these metals.

As noted above, the ultrathin porous nanoscale membranes of the present invention can be used to form a filter device for filtration of any material, either particulates or dissolved solids, entrained in fluids. In its simplest form, the filter device of the present invention includes at least one of the porous nanoscale membranes.

In its simplest form, therefore, the filtering of nanoscale products can be carried out by passing a fluid, containing one or more products to be filtered, through the membrane, whereby objects larger than the maximum pore size are effectively precluded from passing through pores of the membrane.

Fluids that can be subject to filtration can be any gas or liquid, including aqueous solutions. According to one embodiment, the fluid to be filtered is a biological fluid. Exemplary biological fluids include, without limitation, saliva, blood, serum, cerebral spinal fluid, mucosal secretions, urine, and seminal fluids.

Products or materials to be filtered can include, without limitation, proteins, viruses, bacteria, colloidal nanoparticles, organic molecular systems, inorganic nanoparticles, dissolved ions, drugs, dyes, sugars, aqueous salts, metals, semiconductor particles, and pharmaceutical compounds. The materials to be filtered can also be a charged species (either negatively or positively charged).

According to one embodiment, the filter device further includes a support having a passage extending between opposite surfaces of the support, wherein the at least one nanoscale membrane is bound to the support, with the at least one nanoscale membrane confronting the passage. The support can be the un-etched semiconductor support to which the membranes are attached. Alternatively, if one or more of the membranes are removed, e.g., from the etched wafer, the membranes and their accompanying supports can be embedded in a device that provides the membrane(s) in one or more passages for filtering materials from a fluid capable of passing through the membrane.

Figure 4A:
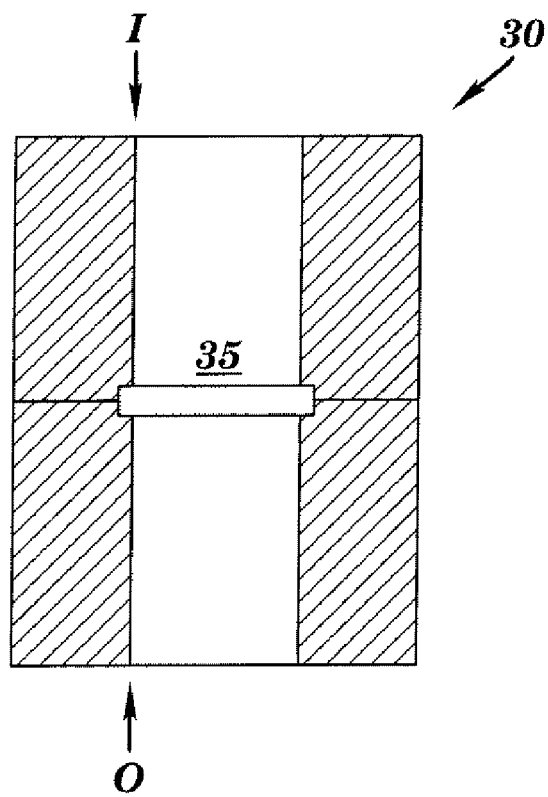
FIGS. 4A-B illustrate a system where a membrane is bound in a device or a casing, thereby essentially creating a filter. In this system, the outer diameter can be adapted for use in a range of devices that utilize the filters.
Figure 4B:
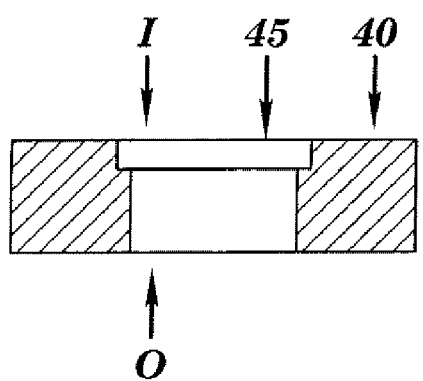

Examples of such devices are shown in FIGS. 4A-B. This type of device can be in the form of an adapter 30, 40 (having an inlet I and an outlet O, with the support and membrane 35, 45 being positioned on or secured to the adapter such that the passage through the support is in fluid communication with the inlet and outlet), where the adapter is designed for installation in existing filtration equipment. A microfluidic flow device, a dialysis machine, or a fuel cell can include the filter device according the present invention.

With regard to microfluidic flow devices, the ability to actively control the permeability of semiconductor membranes will allow the construction of dynamic microfluidic devices for protein purification and analysis. Among these applications, tunable microchromatography systems and microfluidic systems that concentrate proteins before releasing them to an analysis chamber can be utilized.

Figure 5:
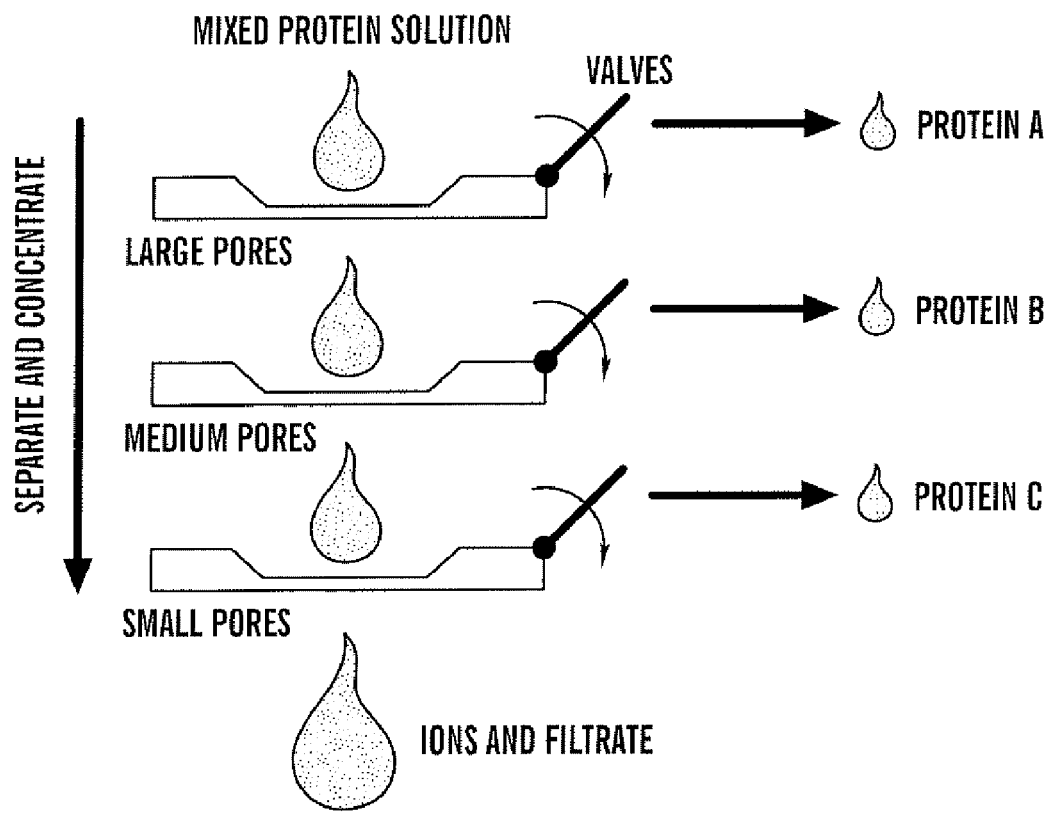
FIG. 5 is a schematic illustrating one embodiment for serial separation of proteins. The arrangement will allow the isolation of proteins into chambers based on protein size. Continuous flow will concentrate proteins before valves opens and drain individual compartments. Active control of nanomembrane porosity (see FIG. 7) would allow a flexible chromatography system to isolate proteins from a variety of biofluids.

In one embodiment, the filter device includes two or more nanoscale membranes having different maximum pore sizes, wherein the two or more nanoscale membranes are serially positioned relative to the direction of fluid flow with a membrane having a smaller maximum pore size being downstream of a membrane having a larger maximum pore size. Alternatively, the filter device includes three or more nanoscale membranes serially positioned as described above. Depending upon the materials to be filtered, any number of membranes can be used to provide serial filtration in this manner. Serial filters of this type are illustrated in FIG. 5.

The results presented herein demonstrate faster filtration and better size selectivity than existing commercial filters, and with simple integration of the membranes into microfluidic systems, serial filtration devices will allow for the rapid fractionation and assay of blood proteins or other fluids containing mixed populations of proteins and other compounds. Such a device could replace expensive and time-consuming electrophoresis assays currently used in clinical blood labs (Williams et al., *Biochemistry in Clinical Practice*, Elsevier, N.Y. (1985), which is hereby incorporated by reference in its entirety) with a rapid assay requiring a finger-prick's worth of blood (20 uL).

The ability to dynamically adjust pore sizes or to control permeability to particular species with an on/off switch will allow for production of microfluidic devices that first concentrate and then release a protein into a reaction chamber or sensor in lab-on-a-chip applications. An adjustable pair of pnc-Si membranes can define the entry and exit walls of a protein isolation chamber in an on-chip purification system, and because the pore sizes would be tunable with a voltage setting, the same system can be used to purify different proteins from cocktails. Further assembling more than two of these membranes in series will allow the construction of an adjustable microfluidic chromatography system to fractionate a protein cocktail an a user-defined fashion (FIG. 5).

This work with pnc-Si membranes represents the first use of ultrathin planar-type nanomembranes for size-based molecular separations. First, the separation of serum molecules, albumin and IgG, suggests the integration of pnc-Si membranes with microfluidic blood analyzers or antibody purification systems. In fact, several membranes may be arranged in series to develop microfluidic systems that fractionate complex protein mixtures. Most significant is the improved rate of transport achieved with pnc-Si membranes. The diffusion measurements recorded transport of 156 nmol/cm$^2$ per hr for Alexa dye. This rate is more than one order of magnitude faster than those reported for channel-type membranes for similarly-sized molecules (Yamaguchi et al., "Self-Assembly of a Silica-Surfactant Nanocomposite In a Porous Alumina Membrane," *Nature Materials* 3:337-341 (2004), which is hereby incorporated by reference in its entirety), and greater than 9× faster than measurements through 50 kD cut-off cellulose dialysis membranes (described in Example 5). The porous nanocrystalline semiconductor-based platform opens several avenues for commercial developments including scalable production of membranes, straightforward integration into microfluidic devices, surface modifications using well-established silane chemistries, and pore size reduction though vacuum deposition of inorganic films (Tong et al., "Silicon Nitride Nanosieve Membrane," *Nano Letters* 4:283-287 (2004), which is hereby incorporated by reference in its entirety). Importantly, the demonstrated mechanical strength of these ultrathin membranes will allow the construction of large-scale dialysis systems and facilitate the use of ultrathin membranes in pressurized filtration devices at the macro and micro-scale.

Figure 6:
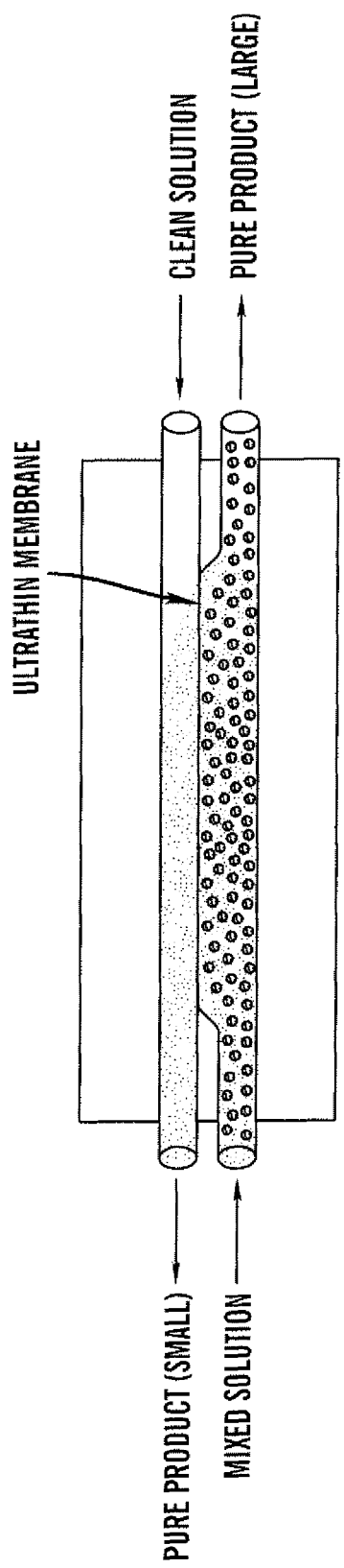
FIG. 6 illustrates a counter current flow cell incorporating an ultrathin pnc-semiconductor membrane. These extremely high efficiency membranes are particularly well suited to this separation technique, where continuous flow prevents accumulation of species near the membrane that can slow diffusion. This geometry also allows for high volume separation, as the carrier solution is not required to pass through the membrane, only the small product needs to diffuse across the barrier.

In a further embodiment, illustrated in FIG. 6, the filter device includes first and second conduits positioned in a substantially parallel arrangement, with the at least one nanoscale membrane positioned between the first and second conduits. This allows for dissolved materials and possibly fluids to pass between the first and second conduits as limited by the pore size of the at least one nanoscale membrane. The direction of fluid flow for the first and second conduits can be in the same direction or in the opposite direction.

Figure 7:
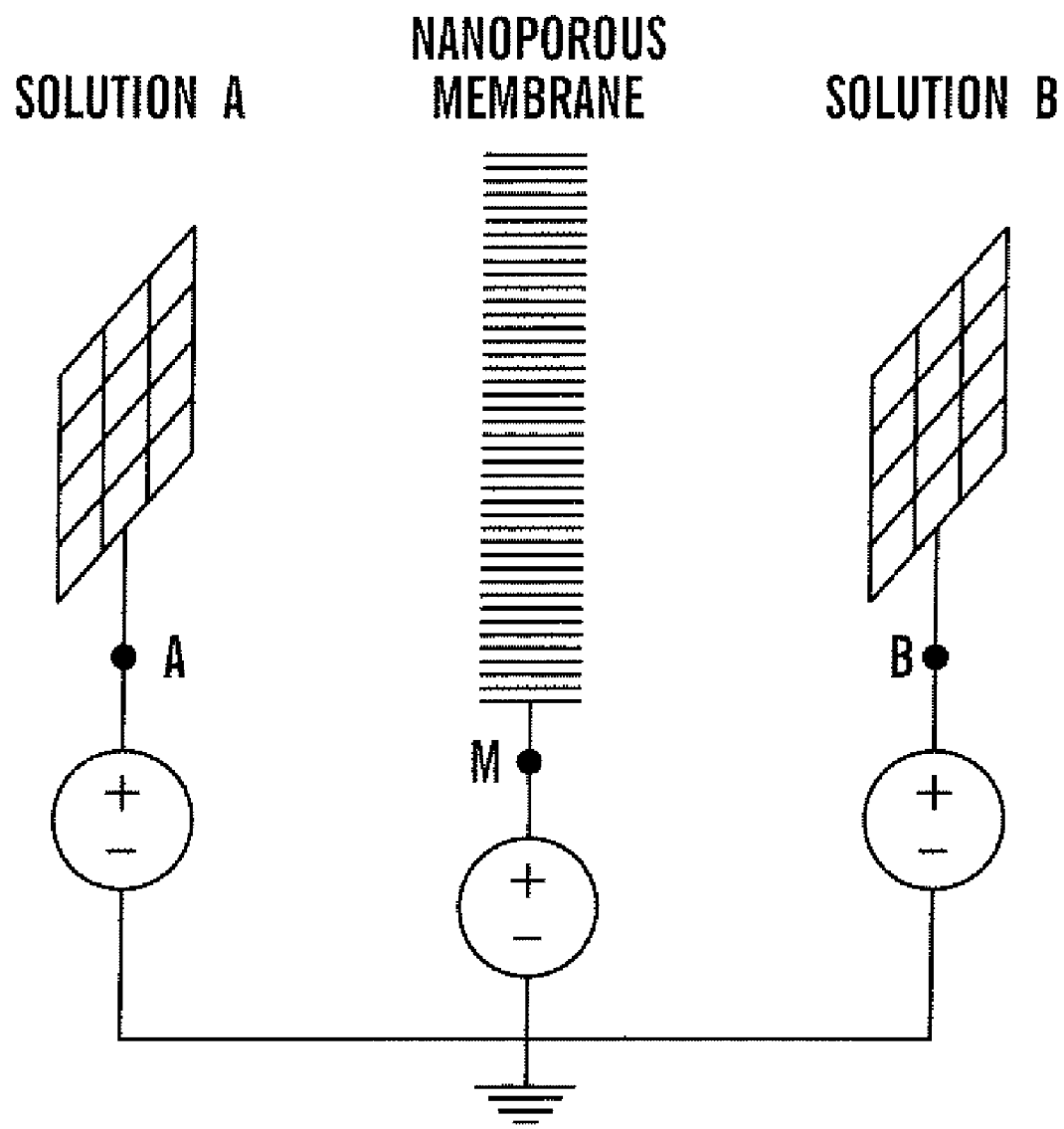
FIG. 7 shows active membrane switching methodologies. A porous membrane separates two solutions A and B, and the switching voltage is either applied directly to the membrane M relative to A/B or across the membrane from point A to point B.

In another embodiment, the filter device includes an electrode coupled to or positioned adjacent the at least one nanoscale membrane. This type of filter device can be used as a gated membrane. The device can include a first electrode positioned on one side of the nanoscale membrane and a second electrode positioned on an opposite side of the nanoscale membrane, and optionally a third electrode coupled to the membrane itself (which has a metal contact thereon, as described above). This embodiment is illustrated in FIG. 7. Upon introduction of an electrolyte solution across the nanoscale membrane, the first and second electrodes are capable of applying a voltage across the electrolyte solution. The third electrode can be used to charge the membrane per se. During use of this type of filter device, charged species can be filtered by applying a voltage differential across the membrane.

Gated membranes may separate species via any one of three transport mechanisms: Fickian diffusion, ion migration, and electro-osmosis. Each electrical switching approach relies on the influence of the electrochemical double layer (the space-charge region created in a solution near a charged surface) on molecular transport through nanoscale pores. As pore size approaches the double layer thickness and a substantial fraction of the pore volume is filled by the space charge region, its influence can be used to actively control transport. The double layer thickness is approximated by the Debye length $\kappa^{-1}=(3.29 zC^{1/2})^{-1}$, where $\kappa^{-1}$ is in nm and C is the molar concentration of the electrolyte (Kuo et al., "Molecular Transport Through Nanoporous Membranes," *Langmuir* 17:6298-6303 (2001), which is hereby incorporated by reference in its entirety). Therefore, the double layer thickness varies from about 30 nm to about 1 nm in aqueous solutions with 0.1 mM to 100 mM ionic concentrations, respectively. The field polarity and magnitude within the double layer is determined by the surface charge density on the pore wall, a function of surface chemistry and solution pH.

Martin and coworkers have developed a process in which commercially available track-etched polycarbonate porous membranes are coated with a precise thickness of gold (Martin et al., "Controlling Ion-Transport Selectivity in Gold Nanotubule Membranes," *Adv. Mater.* 13:1351-1362 (2001), which is hereby incorporated by reference in its entirety). Track-etched filters are characterized by a monodisperse distribution of straight cylindrical pores that extend completely through a 10 micron thick membrane. Gold deposition on the pore walls reduces the pore diameters from ~30 nm to ~3 nm, enhancing the influence of the double layer, and creating a highly conductive membrane material. A voltage can then be applied to this membrane, raising (lowering) its potential relative to solutions A and B, in the geometry depicted in FIG. 7. This causes a decrease (increase) in the electron density in the membrane that perturbs the field intensity of the double layer, thereby modulating the membrane permeability. Clear shifts in diffusion rates for charged ions have been shown with other membrane constructions.

Kuo and coworkers have demonstrated the use of similar polycarbonate track-etched membranes with 15 nm pore size to inject species when a voltage is applied across it (Kuo et al., "Molecular Transport through Nanoporous Membranes," *Langmuir* 17:6298-6303 (2001), which is hereby incorporated by reference in its entirety). The long narrow pores in these membranes tend to have a net positive surface charge on the pore walls that attracts negative counter ions in the double layer. Electro-osmotic flow occurs when a voltage is applied between solutions A and B in the geometry of FIG. 7, inducing flow of mobile counter ions along the length of the pores or channels. This effect becomes stronger as the double layer occupies more of the chamber volume and this filling can be adjusted by changing the ionic strength of the solutions. Flow between solutions A and B can be increased or stopped entirely by applying a relatively high voltage across the nanoporous membrane.

Schmuhl et al. have developed a novel membrane material that can be integrated on a silicon microelectronic platform (Schmuhl et al., "SI-Compatible Ion Selective Oxide Interconnects With High Tunability," *Adv. Mater.* 16:900-904 (2004), which is hereby incorporated by reference in its entirety). Using a 1 micron thick silicon nitride membrane with 1.2 micron diameter pores filled with porous silica to achieve an effective pore size of ~3 nm, Schmuhl et al. have demonstrated that switching behavior in the flow of both cations and anions is achieved by applying a voltage across the membrane between solutions A and B. Switching occurs at a fairly low 2V and there is a clear 'off' state at zero voltage. The switching geometry is similar to that used for electroosmotic switching, but Schmuhl has demonstrated that this effect is dominated by direct flow of ions in the applied electric field (electrophoresis). In this manner, positive or negative charges can be selectively pumped across the membrane by applying appropriate voltage. Again, this selectivity is possible because the double layer occupies most or all of the nanoscale pore volume. All of the switching approaches should be replicable using the nanoscale porous membranes of the present invention, but diffusion rates should be enhanced.

Metal nanoscale membranes of the present invention, preferably those formed of platinum, palladium, or a palladium alloy, can be used in fuel cells of the type described, e.g., in U.S. Pat. Nos. 6,319,306 and 6,221,117 to Edlund et al., both of which are incorporated by reference in their entirety. In this embodiment, the nanoscale membrane selectively passes positively charged species such as hydrogen.

The filter device according to the present invention can further include one or more capture molecules within the pores or on one or both surfaces of the membrane. The capture molecules are selected from the group of antibodies, nucleic acids (RNA or DNA), polypeptides, molecular probes with specific or non-specific affinity for a target molecule, and combinations thereof.

The filter device according to the present invention can also include one or more non-binding, screening, or repulsive molecules tethered to the membrane within the pores. The non-binding, screening, or repulsive molecules can include, without limitation, Teflon, polyethylene glycols, and other organic molecules.

Regardless of the type of molecule tethered to the surface of the membranes or within the pores, standard glass coupling chemistry can be used. Basically, the semiconductor material that forms the membrane is provided with a thin oxide coating thereon. This process can occur naturally in air, can be accelerated with slightly elevated temperatures and humid environments, and can also be accomplished by exposing the samples to an oxygen plasma at low (20-30° C.) to moderate (100-400° C.) temperatures. The molecules to be tethered can then be bound using any of a variety of coupling strategies.

The available strategies for attaching the one or more capture molecules or the one or more non-binding, screening, or repulsive molecules include, without limitation, covalently bonding the one or more molecules to the surface of the semiconductor membrane, ionically associating the one or more molecules with the surface of the semiconductor membrane, adsorbing the one or more molecules onto the surface of the semiconductor membrane, or the like. Such association can also include covalently or noncovalently attaching the one or more molecules to another moiety (of a coupling agent), which in turn is covalently or non-covalently attached to the surface of the semiconductor membrane.

Basically, the oxidized and hydrolyzed surface of the semiconductor material is first functionalized (i.e., primed) with a coupling agent which is attached to the surface thereof. This is achieved by providing a coupling agent precursor and then covalently or non-covalently binding the coupling agent precursor to the surface of the semiconductor membrane. Once the semiconductor surface has been primed, the one or more molecules to be bound are exposed to the primed semiconductor surface under conditions effective to (i) covalently or non-covalently bind to the coupling agent or (ii) displace the coupling agent such that the one or more molecules covalently or non-covalently binds directly to the oxidized semiconductor surface. The binding of the one or more molecules to the semiconductor membrane is carried out under conditions which are effective to allow the one or more molecules to remain available for interacting (e.g., binding, repelling, etc.) with species to be filtered.

Suitable coupling agent precursors include, without limitation, silanes functionalized with an epoxide group, a thiol, an aldehyde, NHS ester, or an alkenyl; and halide containing compounds.

Silanes include a first moiety which binds to the surface of the semiconductor structure and a second moiety which binds to the tethered molecules. Preferred silanes include, without limitation, 3-glycidoxypropyltrialkoxysilanes with C1-6 alkoxy groups, trialkoxy(oxiranylalkyl)silanes with C2-12 alkyl groups and C1-6 alkoxy groups, 2-(1,2-epoxycyclohexyl)ethyltrialkoxysilane with C1-6 alkoxy groups, 3-butenyl trialkoxysilanes with C1-6 alkoxy groups, alkenyltrialkoxysilanes with C2-12 alkenyl groups and C1-6 alkoxy groups, tris[(1-methylethenyl)oxy]3-oxiranylalkyl silanes with C2-12 alkyl groups, [5-(3,3-dimethyloxiranyl)-3-methyl-2-pentenyl]trialkoxysilane with C1-6 alkoxy groups, (2,3-oxiranediyldi-2,1-ethanediyl)bis-triethoxysilane, trialkoxy[2-(3-methyloxiranyl)alkyl]silane with C1-6 alkoxy groups and C2-12 alkyl groups, trimethoxy[2-[3-(17,17,17-trifluoroheptadecyl)oxiranyl]ethyl]silane, tributoxy[3-[3-(chloromethyl)oxiranyl]-2-methylpropyl]silane, and combinations thereof. Silanes can be coupled to the semiconductor membrane according to a silanization reaction scheme shown in FIG. 9A of PCT Publication No. WO/2002/068957, which is hereby incorporated by reference in its entirety.

Figure 9A:
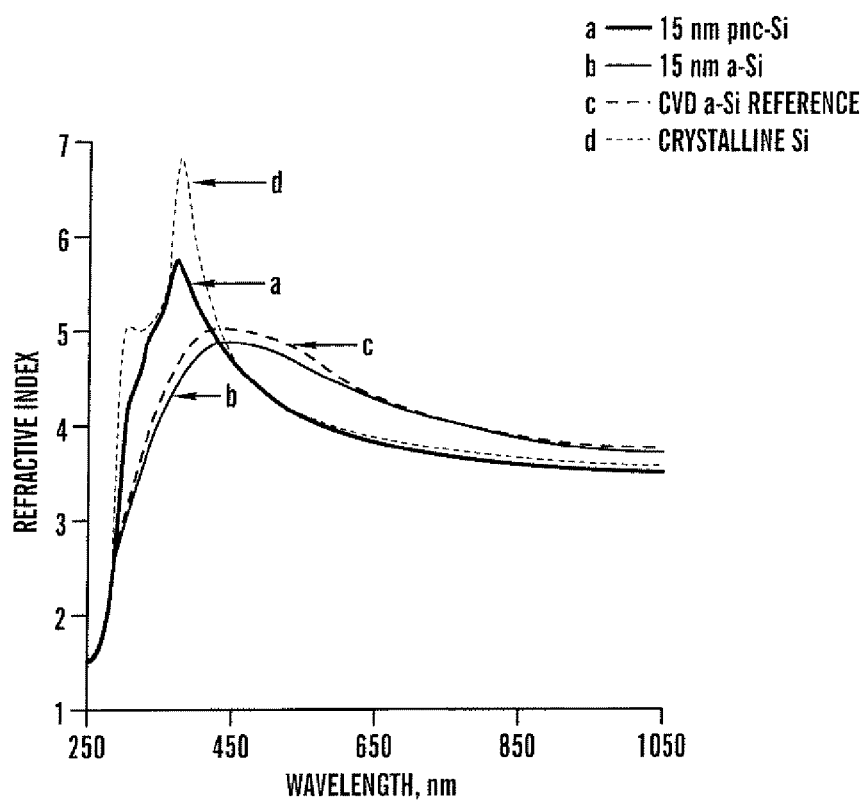
FIGS. 9A-D illustrate the physical properties of pnc-Si membranes.
Figure 9B:
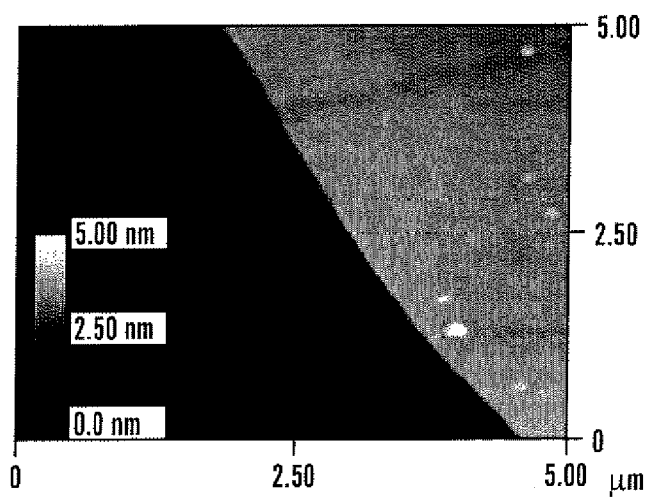

Halides can also be coupled to the semiconductor membrane according to the reaction scheme set in FIG. 9B of PCT Publication No. WO/2002/068957, which is hereby incorporated by reference in its entirety.

Thereafter, the one or more molecules are bound to the semiconductor membrane according to the type of functionality provided by the one or more molecules. Typically, the one or more molecules are attached to the coupling agent or displace to coupling agent for attachment to the semiconductor membrane in aqueous conditions or aqueous/alcohol conditions.

Figure 10A:
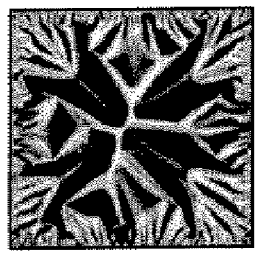
FIGS. 10A-E depict 7 nm and 3 nm nc-Si membranes formed using sacrificial 20 nm $SiO_2$ films.
Figure 10B:
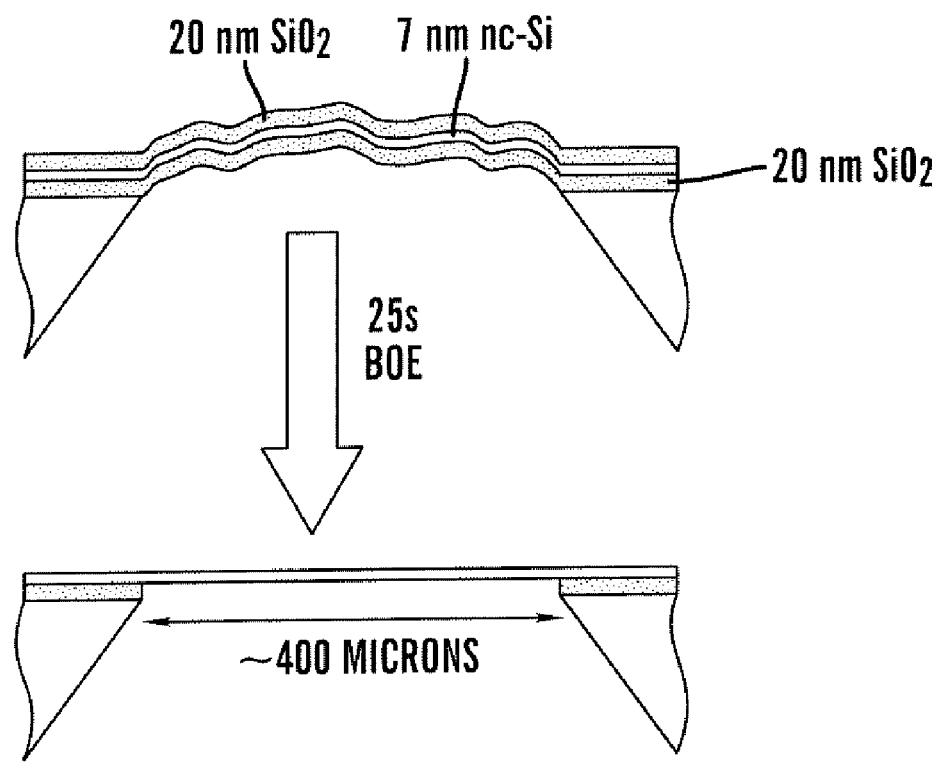
Figure 10E:
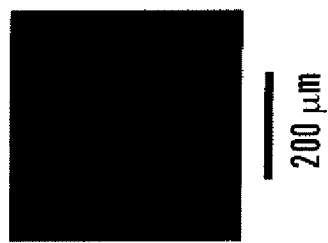

Epoxide functional groups can be opened to allow binding of amino groups according to the reaction scheme set forth in FIG. 10A of PCT Publication No. WO/2002/068957, which is hereby incorporated by reference in its entirety. Epoxide functional groups can also be opened to allow binding of thiol groups or alcohols according to the reaction scheme set forth in FIGS. 10B-C, respectively, of PCT Publication No. WO/2002/068957, which is hereby incorporated by reference in its entirety.

Figure 10D:
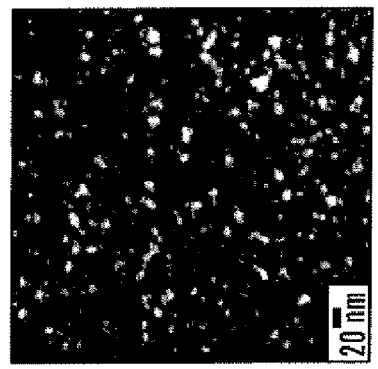
Figure 10C:
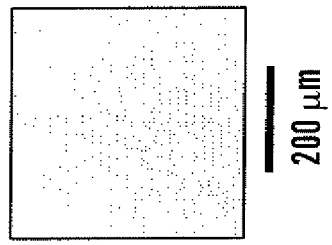

Alkenyl functional groups can be reacted to allow binding of alkenyl groups according to the reaction scheme set forth in FIG. 10D of PCT Publication No. WO/2002/068957, which is hereby incorporated by reference in its entirety.

Where a halide coupling agent is employed, the halide coupling agent is typically displaced upon exposing the primed semiconductor membrane to one or more molecules (as described above), which contain alcohol groups as the semiconductor-binding groups. The displacement can be carried out according to the reaction scheme set forth in FIG. 10E of PCT Publication No. WO/2002/068957, which is hereby incorporated by reference in its entirety.

Where the one or more capture molecules contain two or more target-binding groups, it is possible that the target-binding groups may also interact and bind to the primed surface of the semiconductor membrane. To preclude this from occurring, the primed porous semiconductor membrane can also be exposed to a blocking agent. The blocking agent essentially minimizes the number of sites where the one or more capture molecules can attach to the surface of the semiconductor membrane. Exposure to the blocking agent can be carried out prior to exposing the primed surface of the semiconductor membrane to the capture molecule or simultaneous therewith. The blocking agents can be structurally similar to the capture molecules except that they lack a target-binding group or the blocking agents can be simple end-capping agents. By way of example, an amino acid alkyl ester (e.g., glycine methyl ester, glycine ethyl ester, 3-alanine methyl ester, etc.) blocking agent can be introduced to an epoxide-functionalized semiconductor structure surface as shown in FIG. 10A of PCT Publication No. WO/2002/068957, which is hereby incorporated by reference in its entirety, except with the amino group of glycine opening the epoxide ring and covalently binding to the coupling agent.

Figure 8A:
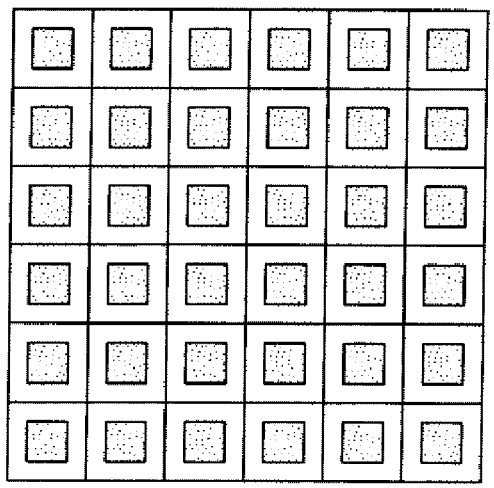
FIGS. 8A-B illustrates a silicon wafer formed with a plurality of wells thereon, each of which can be used to carry out a biological reaction between two or more agents and/or organisms.
Figure 8B:
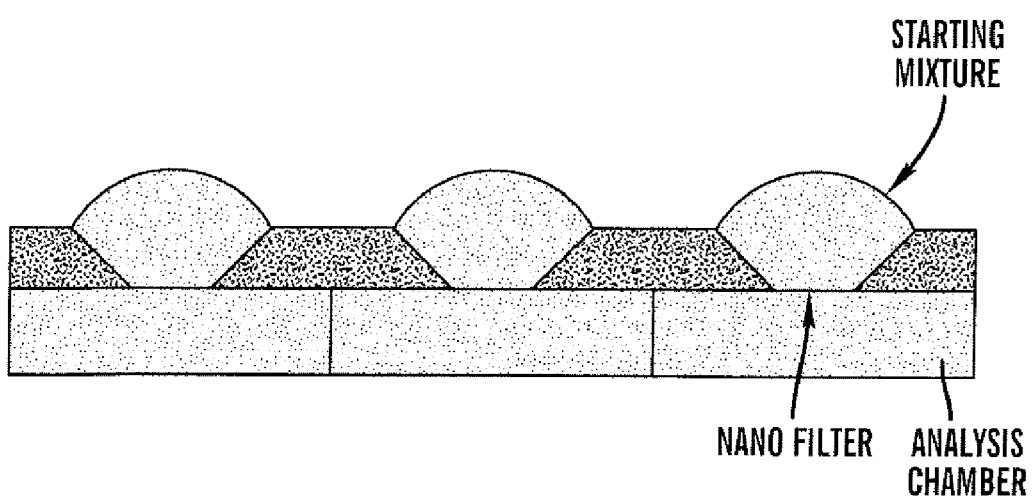

Another aspect of the present invention relates to a device for carrying out a biological reaction. The device includes a substrate comprising one or more wells, each having a bottom and one or more sidewalls, wherein the bottom comprises porous nanoscale membrane of the present invention. One embodiment of such a device is illustrated in FIGS. 8A-B. The device also includes a biological reaction medium in the one or more wells, and two or more reactants individually selected from the group of compounds and organisms. Each well can have a bottom made of a distinct nanoscale membrane or all of the wells can be equipped with the same porous nanoscale membrane.

Suitable compounds can include, without limitation, any one or more of proteins, colloidal nanoparticles, organic molecular systems, inorganic nanoparticles, dissolved ions, drugs, sugars (saccharides or polysaccharides), aqueous salts, metals, semiconductors, pharmaceutical compounds, nucleic acids, enzymes, lipids, carbohydrates, and polypeptides.

Suitable organisms can include, without limitation, a cell line, a primary isolated cell or mixed population of cells, one or more bacteria, a virus, a protoplast, fungus, a parasite, and combinations thereof.

In one embodiment, the membrane includes a cell surface receptor, an antibody, a ligand, a biological reagent, or a combination thereof, on the surface of one or both sides of the membrane or within the pores of said membrane.

In use, a device of this type can be used to carry out a biological reaction in the one or more wells. The biological reaction, if it occurs, forms an end product that can be detected or measured (i.e., quantified). By passing spent biological reaction medium from the one or more wells through the nanoscale membrane, the end product is either passed through the nanoscale membrane or retained in the one or more wells. Its presence in the well (retentate) or in the filtrate can be detected by an immunoassay or nucleic acid detection assay. Exemplary immunoassays include, without limitation, ELISA, radioimmunoassay, gel-diffusion precipitation reaction assay, immunodiffusion assay, agglutination assay, fluorescent immunoassay, protein A immunoassay, and immunoelectrophoresis assay. Exemplary nucleic acid detection assays include, without limitation, polymerase chain reaction, Northern blotting, Southern blotting, ligase detection reaction, and LAMP detection assay. Other detection procedures using color-changing dyes or the like can also be employed.

One embodiment of this biological reaction relates to a method of screening an agent for its activity on a cell. This method involves introducing an agent into the biological reaction medium, which includes the cell, and then analyzing the cell or an end product to identify the activity of the agent on the cell. The same detection procedures employed above can be utilized to detection a cellular response (i.e., upregulation of receptor or cellular protein or other secondary messenger), or direct examination of the cells can be carried out. Assays for targeted cellular responses can be incorporated with the bioassay and filtration procedures described herein.

EXAMPLES

The following examples are provided to illustrate embodiments of the present invention but are by no means intended to limit its scope.

Example 1

Formation of Nanocrystalline Silicon Membranes

Pnc-Si membranes were fabricated by the procedure outlined in FIG. 1. A 500 nm thick layer of $SiO_2$ on both sides of a silicon wafer was first grown by placing it in a semiconductor tube furnace at 1000° C. for 2 hours in an ambient of oxygen and steam. On the backside of the wafer, the $SiO_2$ was patterned using standard photolithography techniques to form an etch mask for the membrane formation process. The etch mask for each membrane included a square-shaped opening centrally positioned within a square border (up to 120 masks have been formed on a single silicon wafer). The front oxide layer was then removed by exposing the surface to 4:1 BOE, for 10 minutes, in an etching cell similar to that used for EDP etching, and a high quality three layer film stack (20 nm-$SiO_2$/15 nm-amorphous silicon/20 nm-$SiO_2$) was RF magnetron sputter deposited on the front surface. The a-Si layer was sputtered at a chamber pressure of 15 mTorr in Ar with a target power density of 0.4 W/cm$^2$, yielding a deposition rate of 3.4 nm/min. The $SiO_2$ layers were reactively sputtered from a silicon target at a chamber pressure of 15 mTorr, with a (3:4) Ar:$O_2$ gas flow ratio, and a target power density of 1.8 W/cm$^2$, yielding a deposition rate of 10.7 nm/min. The deposition recipe is well characterized and capable of depositing films with +/−1% thickness accuracy and surface roughness less than 0.5 nm.

Crystallization of very thin amorphous silicon films, forming high quality nanocrystals with well-defined size has been previously demonstrated (Grom et al., "Ordering and Self-Organization In Nanocrystalline Silicon," *Nature* 407:358-361 (2000), which is hereby incorporated by reference in its entirety). To form the pnc-Si membranes, the substrate was briefly exposed to high temperature (715° C.-770° C. for 30 sec) in a rapid thermal processing chamber, crystallizing the amorphous silicon into a nanocrystalline film. The patterned wafer backside was then exposed to the highly selective silicon etchant EDP (Reisman et al., "The Controlled Etching of Silicon In Catalyzed Ethylenediamine-Pyrocatechol-Water Solutions," *J. Electrochem. Soc.* 126:1406-1415 (1979), which is hereby incorporated by reference in its entirety), which removes the silicon wafer along (111) crystal planes until it reaches the bottom silicon dioxide layer of the front side film stack.

The etching procedure began by exposing the masked backside of the patterned wafer to a 50:1 (hydrofluoric acid: water) solution for 2 minutes to remove any native oxide in the unprotected areas. 250 mL of EDP was then heated to 80° C. in a pyrex beaker while the wafer was mounted in the etching cell. This preheating was performed to prevent the temperature from overshooting the set value during the ramp up to the temperature set point. The preheated EDP was then poured into the etch cell (see FIG. 3) and the solution was heated to 105° C. with stirring. After the temperature stabilized at 105° C., the system remained in a constant equilibrium state for the duration of the etch. Under these conditions, an etch rate of approximately 1.4 μm/minute was obtained, completing a 500 μm etch in about 6 hours.

After etching was complete, the EDP was removed from the cell and the wafers were carefully rinsed in deionized water. Exposing the three layer membrane to 15:1 buffered oxide etchant (BOE) for 60 sec at 22° C. removed the protective oxide layers leaving only the freely suspended ultrathin pnc-Si membrane. A final rinse in ethanol or pentane was typically used to reduce the surface tension while drying the membranes.

This process has been used to fabricate square membranes as thin as 3 nm and as thick as 500 nm; and square membranes as small as 10 μm×10 μm and as large as 3 mm×3 mm. This etch has also been used to outline approximately 120 samples (3.5 mm×3.5 mm) that can be easily removed from the wafer after the fabrication process is complete, and used individually for molecular separation experiments.

Example 2

Formation of Additional Nanocrystalline Silicon Membrane

The procedure described in Example 1 was used to form a 7 nm a-Si layer sandwiched between two 20 nm layers of $SiO_2$ using sputter deposition; the silicon was then annealed at 950° C. for 30 sec to form a nc-Si layer. After release, a wrinkled membrane similar to other oxide membranes was formed (FIG. 10A). However, after the removal of the sacrificial $SiO_2$, with a 25 second dip in buffered oxide etch (BOE), an extremely flat 7 nm ne-Si membrane was produced (see FIGS. 10B-C). This dramatic shift from compressive to tensile stress was unexpected, yet is indicative of the volume contraction that occurs when a-Si is crystallized (Miura et al., *Appl. Phys. Lett.* 60:2746 (1992), Zacharias et al., *Journal of Non-Crystalline Solids* 227-230:1132 (1998), which are hereby incorporated by reference in their entirety). Since the oxide remains compressively stressed after annealing and is much thicker than the a-Si, the overall film stress is compressive in the initial wrinkled film. However, after the oxide is removed, the nc-Si layer is free to return to a tensile state. This two step membrane release process is also very robust with a yield greater than 80% in initial 7 nm process tests. FIG. 10D is a dark field TEM image of a 7 nm nc-Si film showing crystals with dimensions similar to the film thickness, confirming previous reports (Tsybeskov et al., *Mat. Sci. Eng.* B 69:303 (2000), which is hereby incorporated by reference in its entirety). To test the physical limits of this process, the 3 nm silicon membrane in FIG. 10E was fabricated with a width:thickness aspect ratio exceeding 100,000:1. It is believed that this is the thinnest, high aspect ratio membrane ever reported and it clearly demonstrates the capabilities of the single surface etching ("SSE") process. It is possible that even thinner membranes can be formed; no limit has yet been achieved.

Figure 11B:
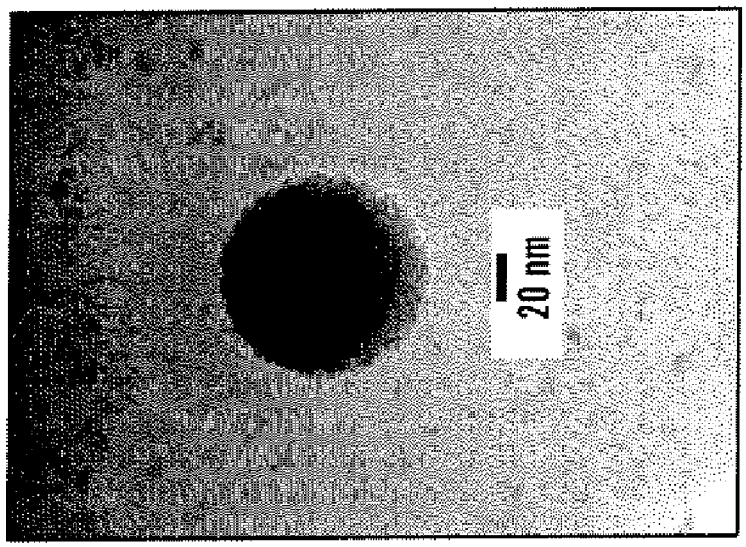
FIGS. 11A-B are plan view TEM test images of commonly available latex spheres. These test images confirmed the high electron transparency of nc-Si/$SiO_2$ membranes and demonstrated that high resolution images can be taken through this structure. The background texture is nc-Si in the membrane.
Figure 11A:
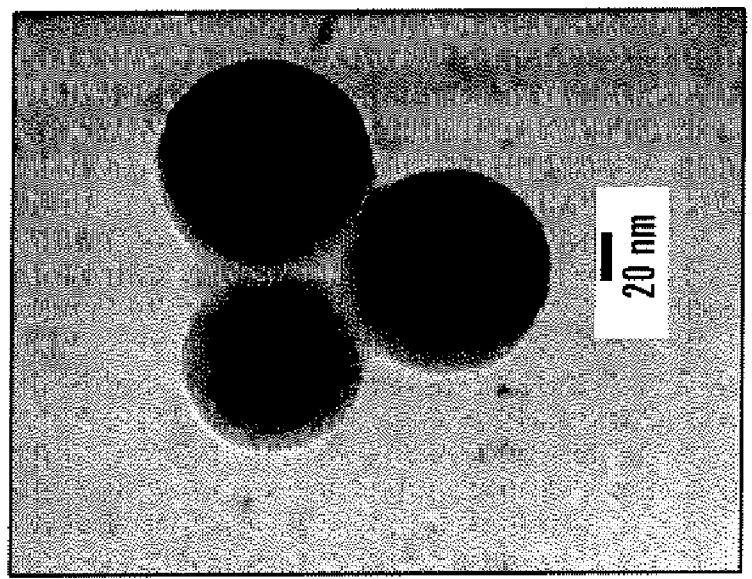

To test the electron transparency of these membrane structures, 90 nm latex spheres were deposited on a few of the three layer sandwich samples with a 7 nm oxide. As seen in FIGS. 11A-B, the membranes were very transparent, the latex was easily imaged, and fine structure is clearly observable. Upon careful inspection, some silicon nanocrystals are observable in the background texture.

Figure 12B:
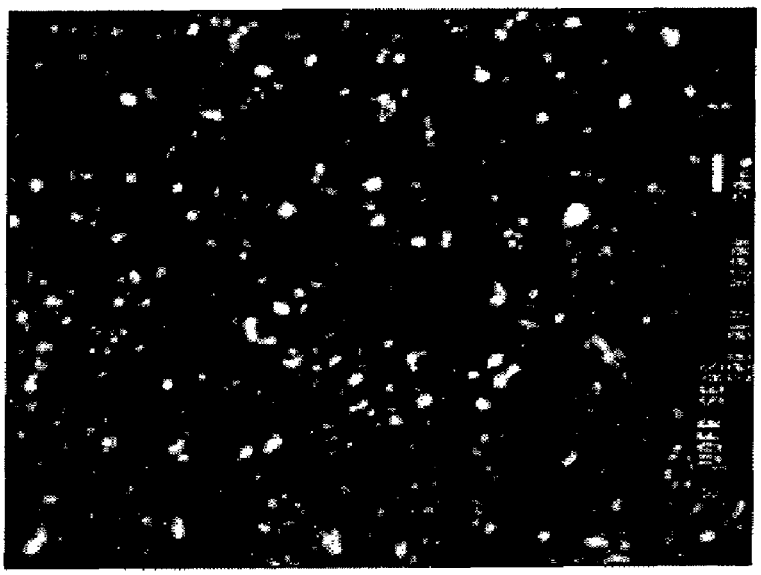
FIGS. 12A-B depict a comparison of bright field and dark field images of a 20 nm thick nc-Si film after RTA only. The bright field image contrast is due primarily to density differences, while the dark field patterns are formed by electron diffraction from crystalline material.
Figure 12A:
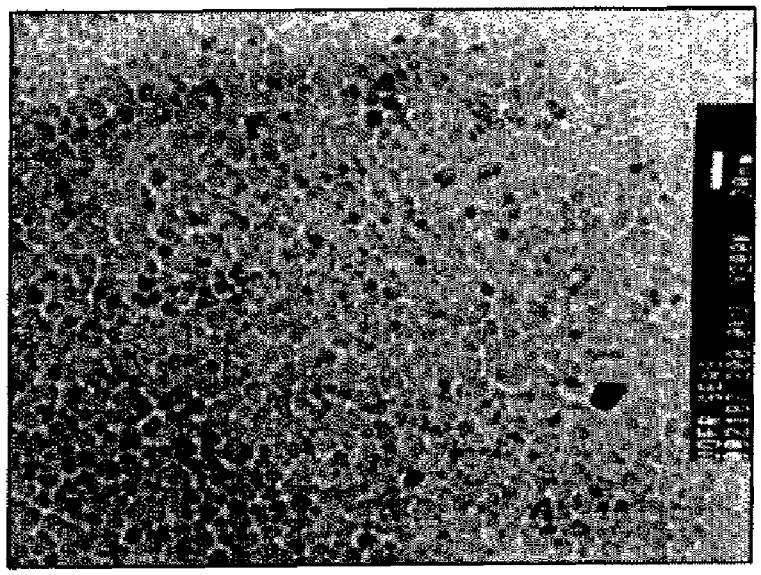

In FIGS. 12A-B, a comparison of bright field and dark field TEM images is made for a 20 nm nc-Si layer that only received an RTA at approximately 750° C. for 60 sec. The bright field mode is directly analogous to an optical microscope operating in transmission. Contrast is obtained primarily through density variations in the sample. In this particular image the grain structure is clearly visible but the degree of crystallization cannot be readily determined. A dark field image is formed only by electrons that have diffracted from crystalline material. Therefore any bright spots in the image are nanocrystals. However, not all crystals are at the proper orientation to support diffraction, and therefore the observed nanocrystals are assumed to be a small fraction of the total.

Figure 13C:
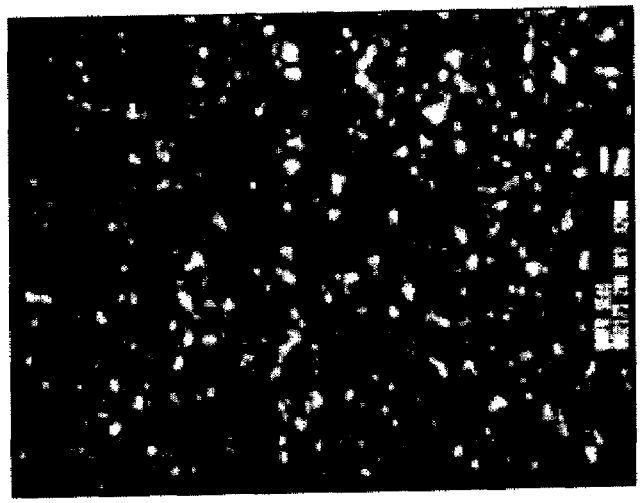
FIGS. 13A-C are TEM dark field images of nc-Si films with different thicknesses. No clear nanocrystal size dependency is observed relative to thickness, but the density of nanocrystals appears to increase for thicker films.
Figure 13B:
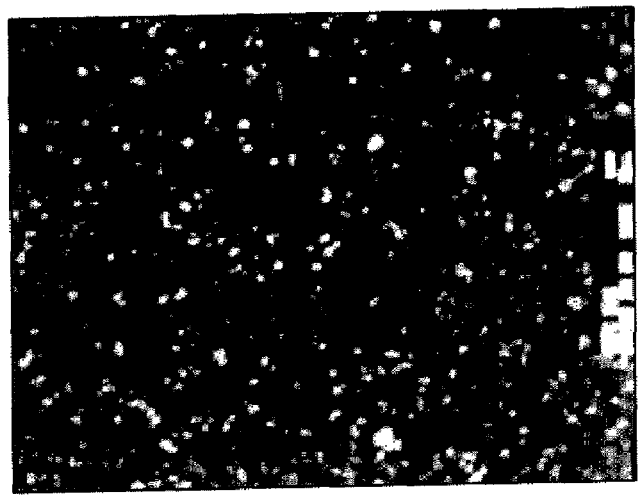
Figure 13A:
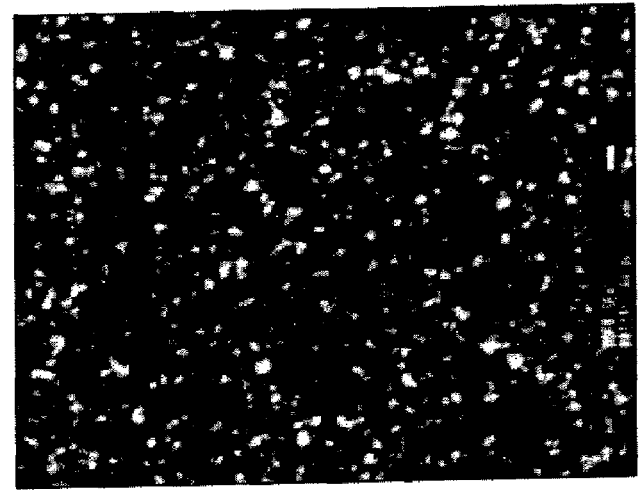

A comparison of films with substantially different thickness was performed to determine the effect of a-Si layer thickness in the lateral size of the nanocrystals. For thin layers the nanocrystals were expected to be spherical and for thicker films, considerably larger brick shapes have typically been observed. The images in FIGS. 13A-C do not agree with these previous observations and surprisingly seem to indicate that no clear size dependence exists for films in this thickness range, although the nanocrystal aerial density does appear to increase with increasing thickness. All images were taken at the same magnification and are directly comparable. It is unclear why the current nc-Si material does not crystallize in the same manner as has been observed in the past. This result is surprising, and illustrates the potential importance of plan view TEM studies in characterizing film structure in this material system.

Images of two 7 nm thick nc-Si layers deposited high refractive index a-Si sputtering conditions are displayed in FIGS. 14A-B. One film was treated with a 750° C., 60 sec RTA only (14A), and the other had both a 750° C., 60 sec RTA and a 1050° C., 10 min furnace anneal (14B). All anneals were done in a nitrogen environment. Both images are dark field and were taken at the same magnification. As with the previous TEM images, a substantial number of bright nanocrystals are observable, however there are also black spots in both images that had not been observed in other samples. These spots are actually holes in the film. In dark field, only properly aligned crystals appear bright, but amorphous and misaligned crystalline material will also scatter the electron beam and produce a very weak background illumination. The dark spots in the images are the absence of this background, indicating that no material is present. This interpretation also agrees with similar bright field images. It is also apparent from these images that the longer furnace anneal promotes the formation of these features because the hole density is much higher in the left image and are either due to voids in the film itself or they are regions of oxide formed during the annealing process that are removed when the barrier oxides are etch away. It was later determined through testing that these holes are actually pores extending through the membrane.

Example 3

Physical Properties of Porous Nanocrystalline Silicon Membranes

In addition to TEM, several other characterization techniques have been used to confirm the properties of the pnc-Si membranes according to the present invention. FIG. 9A shows refractive index dispersion data obtained using spectroscopic ellipsometry for a 15 nm thick silicon film after deposition (a-Si) and after crystallization (pnc-Si) (Tompkins et al., "Spectroscopic Ellipsometry and Reflectometry—A User's Guide," Wiley & Sons, Inc., New York, (1999), which is hereby incorporated by reference in its entirety). The sputtered a-Si has high optical density, comparable to microelectronic quality a-Si deposited with chemical vapor deposition (CVD), and exhibits a clear shift in optical properties after crystallization, with characteristic resonance peaks similar to crystalline silicon (Palik, E. D. "Handbook of Optical Constants of Solids," (Academic Press, Orlando) pp. 547-569 (1985), which is hereby incorporated by reference in its entirety). This data is indicative of high purity silicon films with smooth interfaces. It should also be noted that TEM images of the as deposited a-Si show no distinguishable voids or crystalline features. To confirm the accuracy of the spectroscopic ellipsometry data, several membranes were transferred onto polished quartz and atomic force microscopy (AFM) was used to measure the step height of the membrane edge confirming the 15 nm thickness of the sample membrane and its highly smooth surface.

Figure 9C:
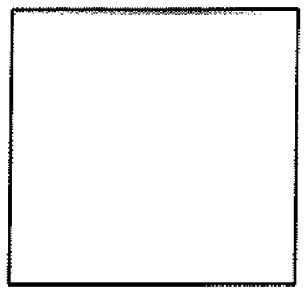
Figure 9D:
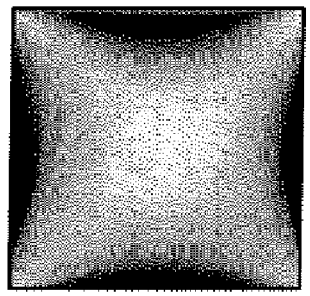

Another important characteristic of pnc-Si membranes is their remarkable mechanical stability. Membranes were mechanically tested using a custom holder to apply pressure to one side of the membrane while an optical microscope was used to monitor deformation. FIGS. 9C-D show optical micrographs of a 200 μm×200 μm×15 nm membrane as 1 atm (15 PSI is the limit of the experimental fixture used) of differential pressure was applied across it for approximately 5 minutes. With no differential pressure, the membrane is extremely flat (FIG. 9C), and at maximum pressure (FIG. 9D) the membrane elastically deforms but maintains its structural integrity throughout the duration of test. Unlike thin polymer membranes (Jiang et al., "Freely Suspended Nanocomposite Membranes As Highly Sensitive Sensors," *Nature Materials* 3:721-728 (2004), which is hereby incorporated by reference in its entirety), pnc-Si membranes exhibit no plastic deformation and immediately return to their flat state when the pressure is removed. Pressurization tests were cycled three times with no observable membrane degradation. The remarkable strength and durability exhibited by these membranes is likely due to their smooth surfaces (Tong et al., "Silicon Nitride Nanosieve Membrane," *Nano Letters* 4:283-287 (2004), which is hereby incorporated by reference in its entirety) and a random nanocrystal orientation that inhibits the formation and propagation of cracks.

Example 4

Pore Size Distribution in Porous Nanocrystalline Silicon Membranes

It was also determined that the pore size distribution in pnc-Si membranes can be controlled through adjustment of the rapid thermal annealing temperature during crystallization. Nanocrystal nucleation and growth are Arrhenius-like processes (Spinella et al., "Crystal Grain Nucleation In Amorphous Silicon," *J. Appl. Phys.* 84:5383-5414 (1998), which is hereby incorporated by reference in its entirety) that exhibit strong temperature dependence above a threshold crystallization temperature of approximately 700° C. in a-Si (Zacharias et al., "Thermal Crystallization of Amorphous Si/SiO$_2$ Superlattices," *Appl. Phys. Lett.* 74:2614-2616 (1999), which is hereby incorporated by reference in its entirety). Existing crystallization models (Zacharias et al., "Confinement Effects In Crystallization and Er Doping of Si Nanostructures," *Physica E.* 11:245-251 (2001), which is hereby incorporated by reference in its entirety) fail to predict void formation and must be extended to account for how volume contraction and material strain lead to pore formation in ultrathin membranes.

To demonstrate pore size tunability, three wafers with 15 nm thick pnc-Si membranes were processed identically, according to the previously described methods, except for the annealing temperature. TEM images of these membranes shown in FIGS. 15A-C revealed that pore size and density increase monotonically with temperature, as samples annealed at 715° C., 729° C., and 753° C. have average pore sizes of 7.3 nm, 13.9 nm, and 21.3 nm, respectively. A sample annealed at 700° C. exhibited no crystallinity or voids, illustrating the strong morphological dependence on temperature near the onset of crystallization. The tunability of pore size in this range makes pnc-Si membranes particularly well suited for size selective separation of large biomolecules, such as proteins and DNA. Because pore area is a key metric for the discussion of molecular transport through these membranes, histograms that identify the total pore area available at each pore size are presented in FIGS. 15A-C. Pore size data was extracted directly from the TEM images using Scion image processing software (Scion Corporation, Frederick, Md.).

Example 5

Protein Separation Using Porous Nanocrystalline Silicon Membrane

To demonstrate molecular separations with pnc-Si, two common blood proteins of different molecular weight (MW) and hydrodynamic diameter (D), BSA (MW=67 kD, D=6.8 nm) and IgG (MW=150 kD, D=14 nm), fluorescently labeled with Alexa 488 and Alexa 546 (Molecular Probes, Eugene Oreg.), respectively, were chosen. Free Alexa 546 dye was also used as an additional low molecular weight (M=1 kD) species. The dye reacts with primary amines forming stable covalent bonds. Each species was twice purified with spin columns provided in the labeling kit. Protein concentration and degree of labeling was calculated by measuring absorbances with a spectrophotometer using extinction coefficients provided by the dye manufacturer. This analysis showed that BSA was labeled with eight moles of dye per mole of protein, while IgG was labeled with three moles of dye per mole of protein. With the microscope used for the above experiments, this yielded similar fluorescence intensity for each species at the same concentration. In the separation experiments, proteins were used at 1 μM, while free dye was used at 100 μM to mimic the separation of proteins from higher concentration solute species as might occur in a buffer exchange or desalting application.

Figure 16A:
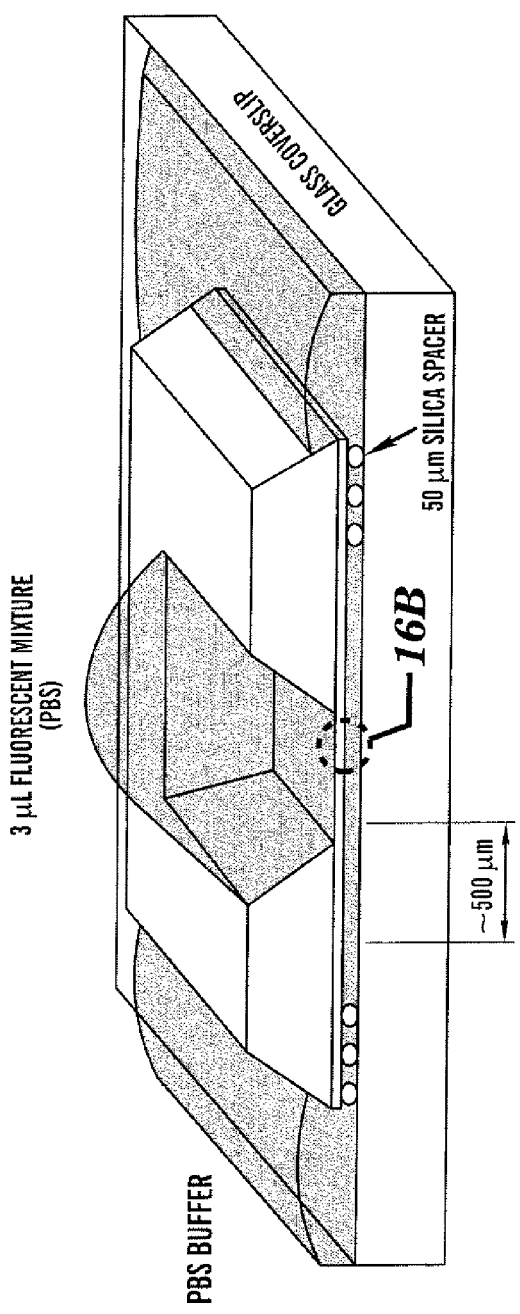
FIGS. 16A-C illustrate molecular separation and transport rates across pnc-Si membranes. The passage of two fluorescent species (labeled proteins or free dye) from a 3 μL source mixture through pnc-Si membranes was monitored simultaneously on two channels of a fluorescence microscope. The membrane edge was imaged from below and the lateral spread of fluorescent material was monitored to determine permeation through the membrane (FIG. 16B). An experimental image taken immediately after the application of the source solution is also displayed, showing the sharp fluorescence edge of the source solution behind the membrane (FIG. 16C).
Figure 16B:
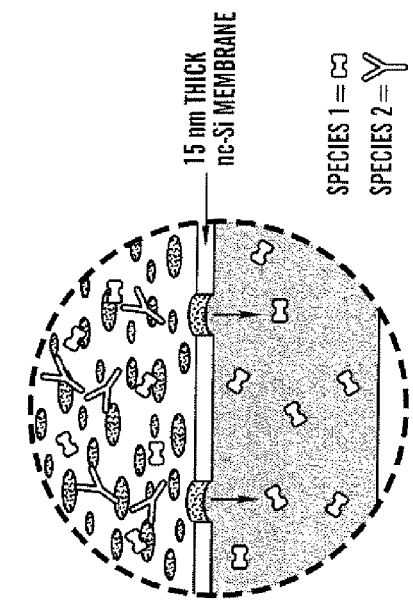
Figure 16C:
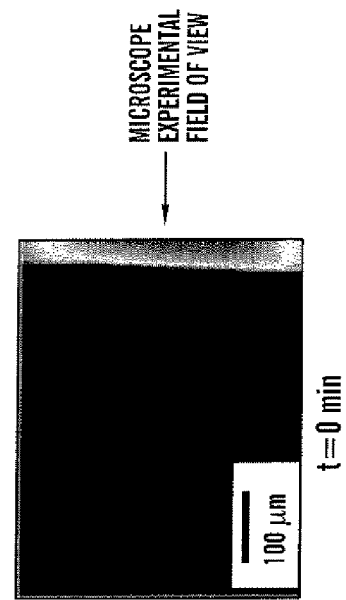

The passage of these species through the pnc-Si membranes, shown in FIG. 16B, was monitored using real time fluorescence microscopy. In this setup (FIG. 16A), a membrane and its supporting silicon wafer frame was placed on a glass slide with 50 μm silica spacers forming a thin diffusion chamber beneath the membrane. The chamber was first filled with approximately 50 μL of clean phosphate buffered saline ("PBS"). Then, 3 μL of a fluorescent protein (1 uM) and/or dye (100 uM) in PBS, as described above, was added to the well above the membrane. An image of the membrane edge was taken every 30 seconds in each of the fluorescent channels. The passage of each species through the membrane was observed as the spreading of fluorescence signal from the membrane edge. FIG. 16C shows a false color image of the membrane edge immediately after the mixture was added to the well. The membrane appears bright from the fluorescent species in the well above, and the uniform darkness beyond the membrane edge indicates that no fluorescent molecules have passed through the membrane into the underlying chamber.

Figure 15A:
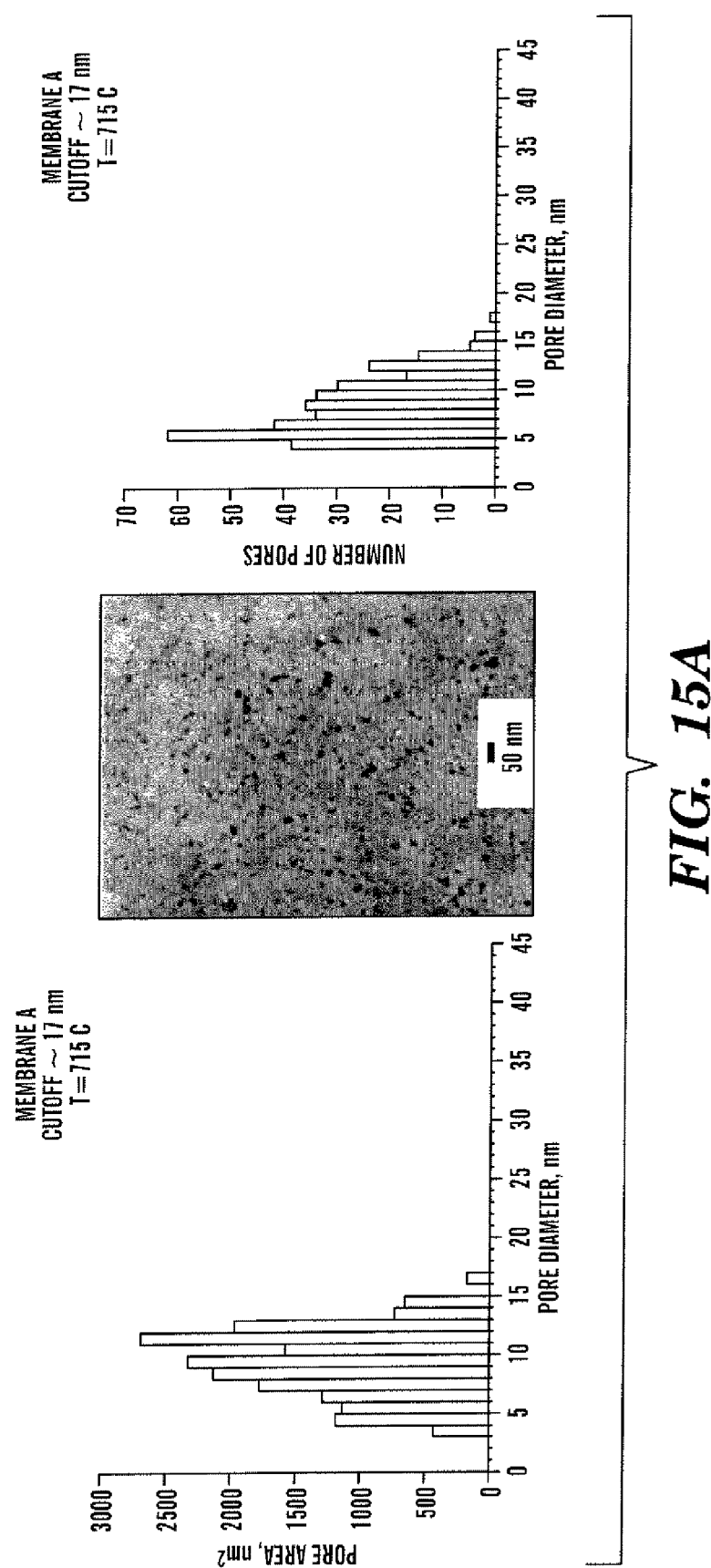
FIGS. 15A-C illustrate the tunability of pnc-Si membrane pore size. By varying the temperature at which the silicon film is crystallized, pore diameter can be controlled. The maximum (cut-off) pore size and porosity increase with annealing (RTA) temperature from 715° C.

FIG. 17A shows the results of a membrane permeation experiment comparing BSA to free Alexa 546 dye using the membrane of FIG. 15A. The passage of the two fluorescent species (labeled BSA and free dye) from a 3 μL source mixture through pnc-Si membranes was monitored simultaneously on two channels of a fluorescence microscope (FIG. 16B). The membrane edge was imaged from below and the lateral spread of fluorescent material was monitored to determine permeation through the membrane. An experimental image taken immediately after the application of the source solution is also displayed, showing the sharp fluorescence edge of the source solution behind the membrane. The false color images (FIGS. 17B-C) show how the fluorescence spreads after 6.5 minutes for each species and the adjacent graph (FIG. 17A) shows a quantitative comparison of the fluorescence intensity. From these results it is clear that dye passes freely through the membrane while BSA is almost completely blocked.

There are several possible reasons why BSA was retained behind a membrane with maximal pore sizes more than twice as large as the molecule's hydrodynamic diameter. Charge-charge interactions between proteins and the membrane's native oxide layer, protein adsorption that partly obstructs pores, and uncertainty in the relationship between hydrodynamic dimensions and the physical size of proteins, could all contribute.

Figure 15B:
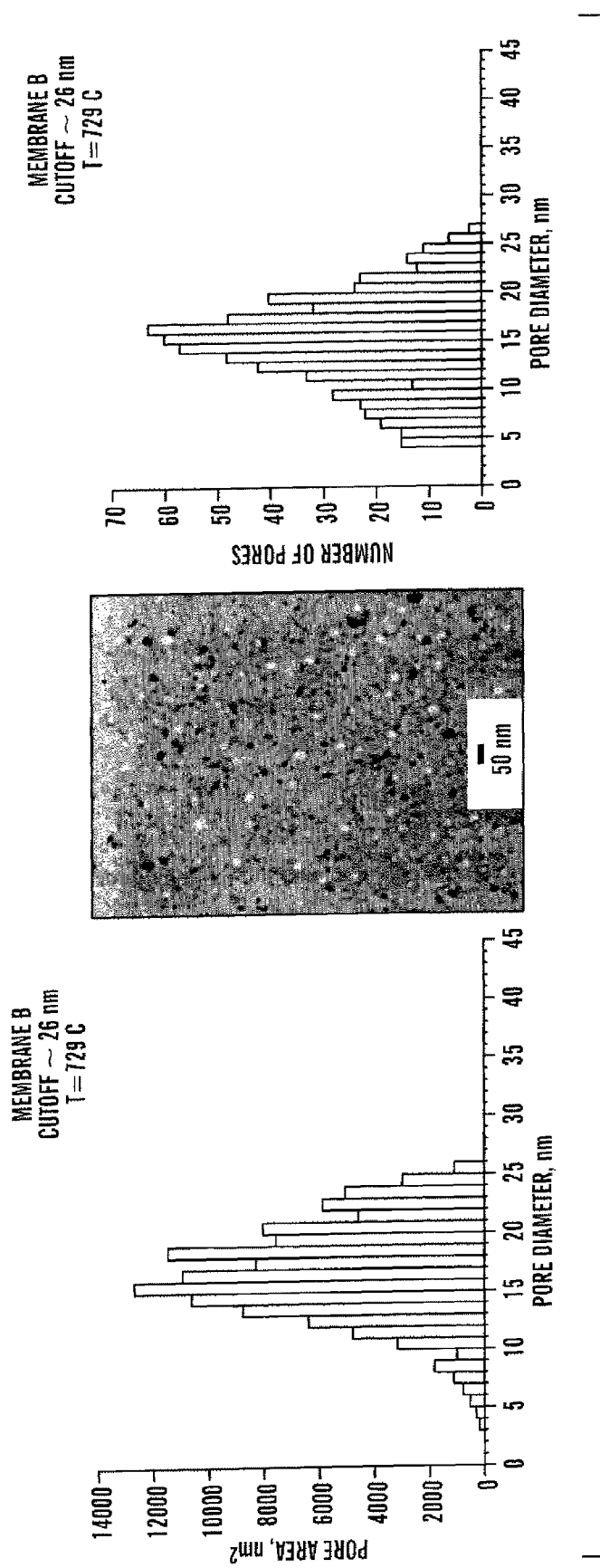
Figure 15C:
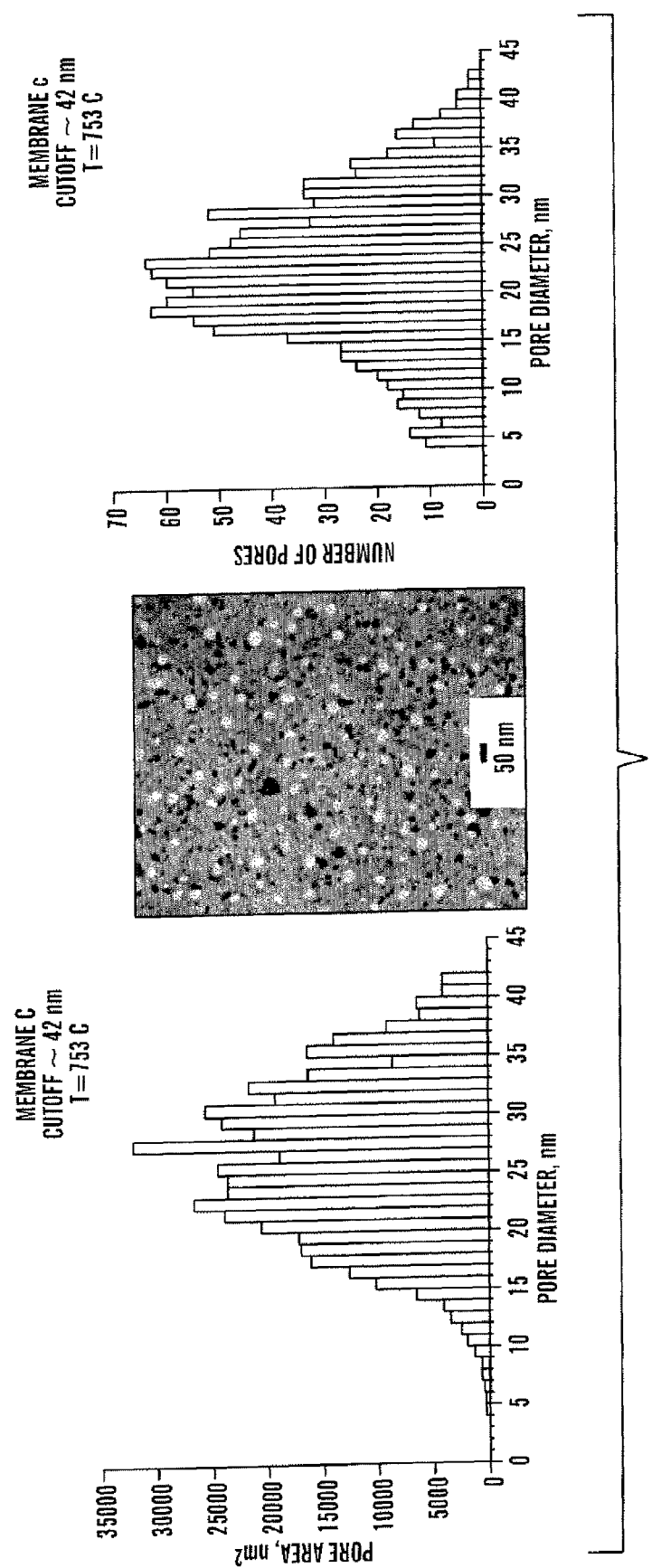
Figure 18:
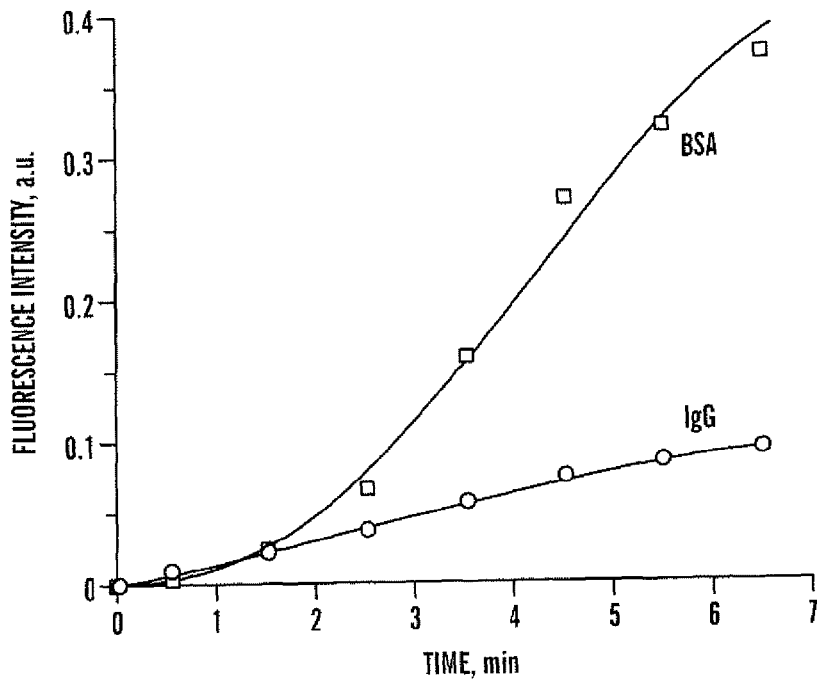
FIG. 18 shows that using a membrane according to FIG. 15B, i.e., Membrane B, a 3-fold separation of proteins BSA (MW~67 kD) and IgG (MW~150 kD) was observed using the method described above. The larger size cutoff of this membrane, i.e., Membrane B, enables greater than 15× increase in the transport of BSA relative to the membrane of FIG. 15A, i.e., Membrane A.

FIG. 18 shows a similar experiment, performed as described above for the BSA experiment, where the permeability of IgG and BSA at 1 μM concentration was compared using the membrane of FIG. 15B. In this case, BSA diffused through the membrane ~3× more rapidly than IgG. Because the molecular diffusion coefficients for these molecules are within 25% of each other (Karlsson et al., "Electronic Speckle Pattern Interferometry: A Tool For Determining Diffusion and Partition Coefficients For Proteins In Gels," *Biotechnol. Prog.* 18:423-430 (2002), which is hereby incorporated by reference in its entirety), the measured rate difference clearly indicates that pnc-Si membranes hinder IgG diffusion relative to BSA diffusion. By more thoroughly optimizing pore sizes, one can expect to engineer pnc-Si membranes that can completely exclude IgG but permit BSA passage. However, even with the existing membranes, it should be possible to enhance the separation by arranging several membranes in series. It should also be noted that the plots of FIGS. 17A and 18 can be quantitatively compared for BSA, demonstrating that the increased cut-off size of membrane B (FIG. 15B) allows a 15× enhancement of BSA diffusion relative to membrane A (FIG. 15A).

Given the hours-long passage-times of molecules through channel-type membranes (Yamaguchi et al., "Self-Assembly of a Silica-Surfactant Nanocomposite In a Porous Alumina Membrane," *Nature Materials* 3:337-341 (2004), which is hereby incorporated by reference in its entirety), it is significant that filtrate molecules appear downstream of pnc-Si filters within minutes. To better quantify the transport through pnc-Si membranes, the fluorescence microscopy experiments were followed with benchtop experiments in which one could remove and assay the Alexa 546 dye that diffused across membrane A from a 100 μM starting concentration. Dye diffusion through pnc-Si membranes was compared to diffusion through standard regenerated cellulose dialysis membranes.

Pnc-Si membranes were assembled on an aluminum support. The volume below the membrane was filled with 100 μL of clean PBS. 3 μL of 100 μM fluorescent dye in PBS was placed in the Si well above the membrane. At the time points shown in FIG. 19, the 100 μL from beneath the membrane was removed. Absorbance was measured on a spectrophotometer to determine the concentration of dye that had transported across the pnc-Si membrane. To measure dye transport across the 50 kD dialysis membrane, diffusion was measured across a comparable membrane surface area. The dialysis membrane was pulled taut and sealed against the tip of a micropippette. 3 μL of 100 μM fluorescent dye in PBS was loaded into the pipette. The entire pipette was submerged into a microcentrifuge tube with 100 μL of clean PBS. At the specified time points, the 100 μL volume was removed and measured for absorbance. For both experiments, each time point is representative of unique experiments.

Figure 19:
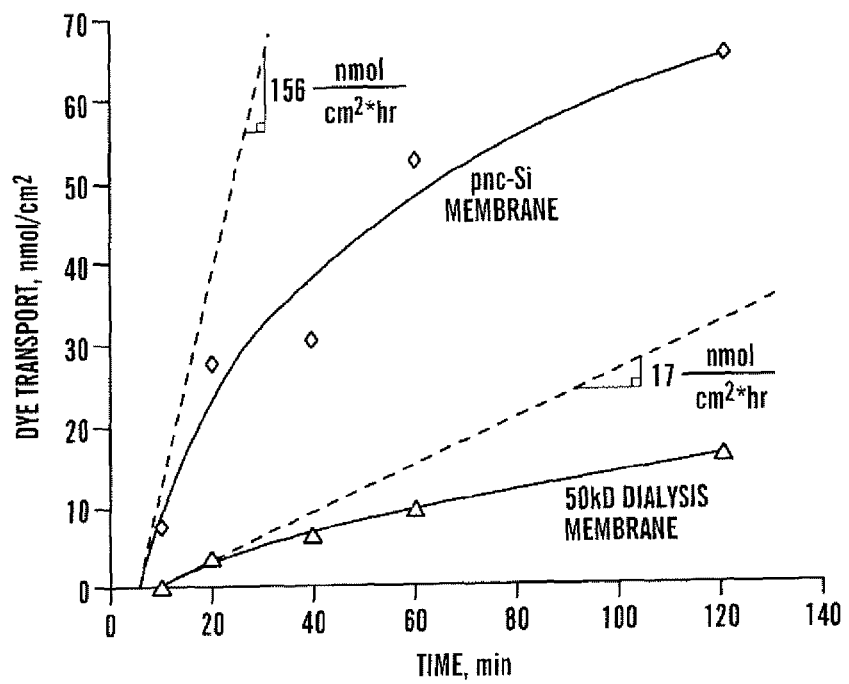
FIG. 19 shows that the diffusion rate of dye through Membrane A, i.e., the membrane according to FIG. 15A, was benchmarked relative to a commercial dialysis membrane with a 50 kD cutoff (50× larger than the dye MW). Because the 3 μL of source dye quickly depletes, the transport rate is calculated as the initial slope of the transport curve. The dialysis membrane should be highly permeable to this 1 kD dye, yet transport is greater than 9× more rapid in the pnc-Si membrane. Concentration of the dye was measured by 558 nm absorption at each time point.

The results shown in FIG. 19 reveal that diffusion through pnc-Si membranes is over 9× faster than dialysis membranes with comparable size exclusion properties. The pnc-Si membranes exhibit an initial transport rate of 156 nmol/cm² per hr (FIG. 19) that rapidly slows as the 3 μL source volume depletes, lowering the concentration gradient across the barrier. A dialysis membrane with a 50 kD cut-off was chosen for this experiment, based on the excellent retention of BSA (66 kD) by membrane A of FIG. 15A. Remarkably, when this experiment was repeated on membrane C, i.e., FIG. 15C, for 1 hour, an increase of less than 10% in dye transport was measured, despite porosities differing by 30 fold (0.2% vs. 5.7%). This indicates that dye transport is essentially unhindered by the membranes according to the present invention, as porosities far lower than that of membrane A should theoretically allow greater than half-maximal diffusion through an infinitely thin porous barrier (Berg, H. C., "Random Walks in Biology," Princeton University Press, pp. 34-37 (1993), which is hereby incorporated by reference in its entirety). Therefore, the observed greater than 9× increase in diffusion rate over conventional dialysis membranes is essentially the physical limit of free diffusion in this experiment.

Example 6

Protein Separation of Three Species Using Serial Separation

To test the capacity of pnc-Si membrane to filter blood proteins, fluorescent red and green-labeled bovine serum albumin (BSA), IgG, and IgM were created (Table 1), and diffusion through membranes was monitored using a fluorescence microscope.

TABLE 1

Molecules Used in Separation Studies

| | Free Fluorecent Dye | Bovine Serum Albumin (BSA) | IgG antibody | IgM antibody |
|---|---|---|---|---|
| MW (daltons) | ~1,000 | ~66,000 | ~150,000 | ~970,000 |
| Experimental Concentration (M) | ~1 × 10⁻⁶ | ~1 × 10⁻⁶ | ~1 × 10⁻⁶ | ~1 × 10⁻⁶ |
| Protein mass/volume (mg/ml) | — | ~0.07 | ~0.15 | ~0.97 |
| Hydrodynamic radius (nm) | 1 nm | ~3.5 nm | ~7 nm | ~14 nm |

The membrane and its silicon support were positioned 50 μm from a microscope coverslip using silica beads as spacers (see, e.g., FIG. 16A). The channel between the coverslip and the membrane structure was filled with phosphate buffered saline. A 3 μl volume containing one red and one green fluorescently labeled species was then added to the top of the membrane. The microscope system imaged the arrival of fluorescent molecules in the channel using a field-of-view that included one edge of the membrane. In this way early images contained a sharp intensity difference at the membrane edge that diminished with time as fluorescent molecules passed through the membrane.

Figure 20A:
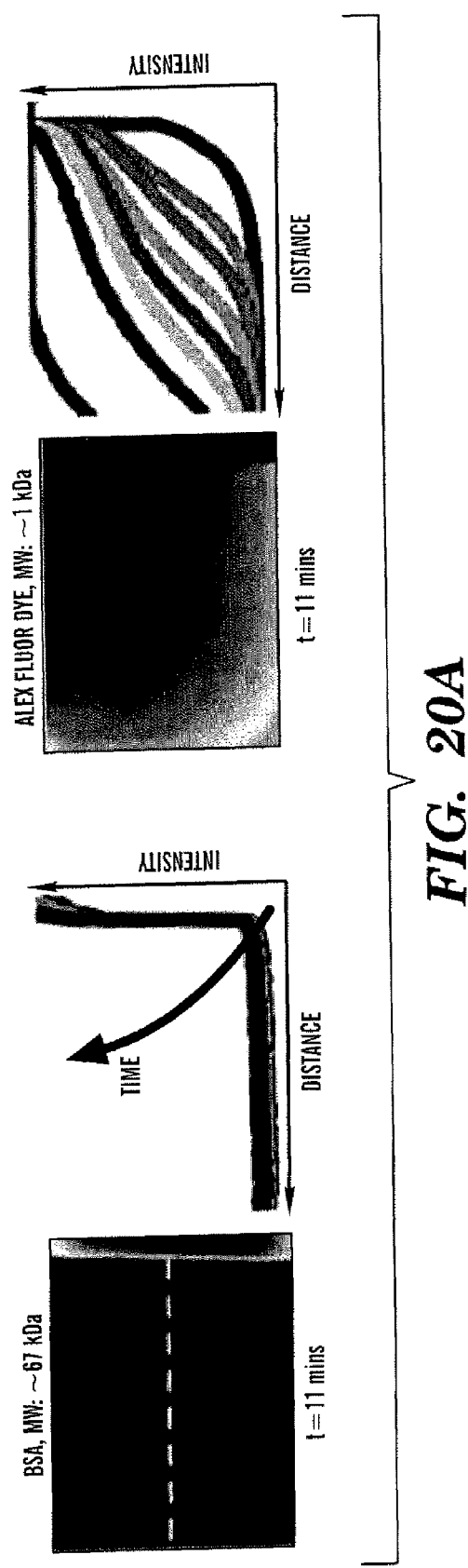
FIGS. 20A-C show separation experiments. The three panels demonstrate separation of the three pairs of neighboring molecules in Table 1, referenced in Example 6. Each panel shows fluorescence images from the microscope set-up (as illustrated in FIG. 16A) with the membrane and its contained material visible on the right of the image. Average horizontal intensity profiles are shown adjacent to each image.
Figure 20B:
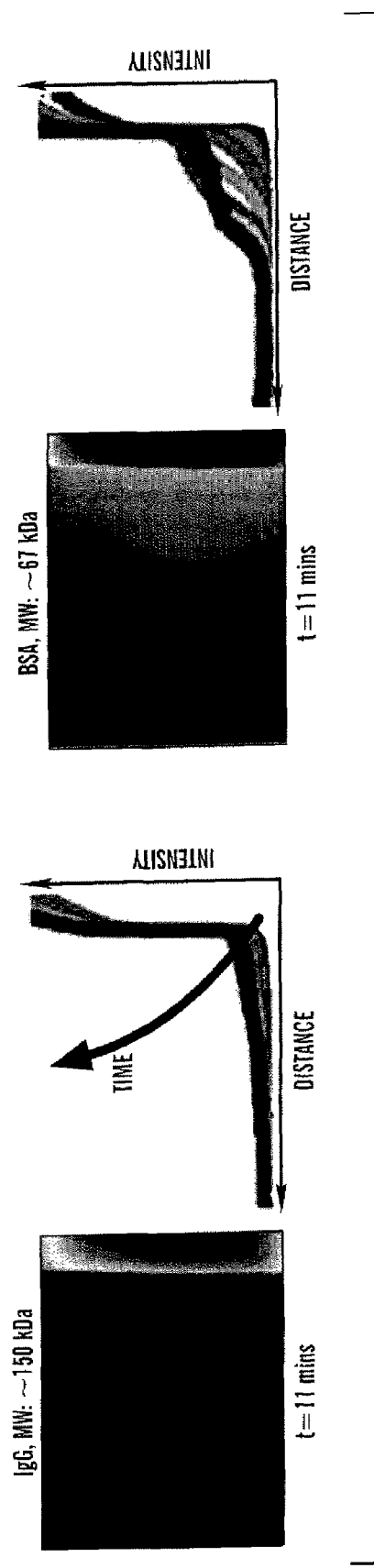
Figure 20C:
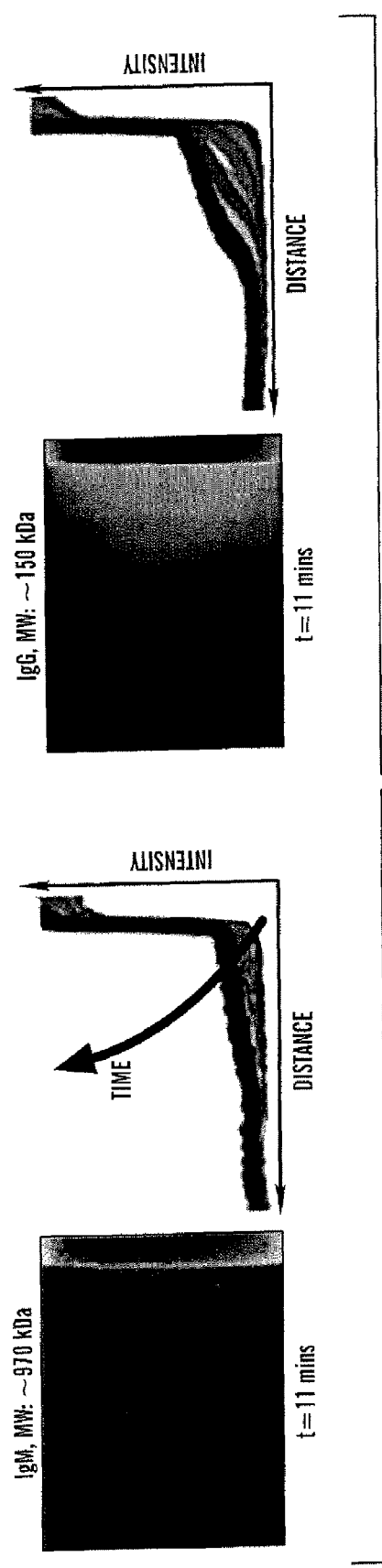

Experimental results are shown in FIGS. 20A-C. Each of the three main panels of this figure compares the transport for two molecules of neighboring molecular weight using one of the membranes of FIGS. 15A-C. In all three cases: IgM and IgG (FIG. 20C), IgG and BSA (FIG. 20B), and BSA and free dye (FIG. 20A), a membrane provided excellent separation between the two molecules after 11 minutes in the system. FIG. 20A shows nearly perfect exclusion of BSA and rapid passage of dye. This suggests that these membranes may be highly effective for the selective removal of small molecular weight compounds from larger blood proteins in renal dialysis applications. Protein separations in FIGS. 20B-C are excellent despite the fact that only the membranes characterized in FIGS. 15A-C were available as candidates in testing. By engineering an array of membranes with different mean pore sizes, it is expected that membranes with better selectivity for BSA and IgG will be found.

Figure 21:
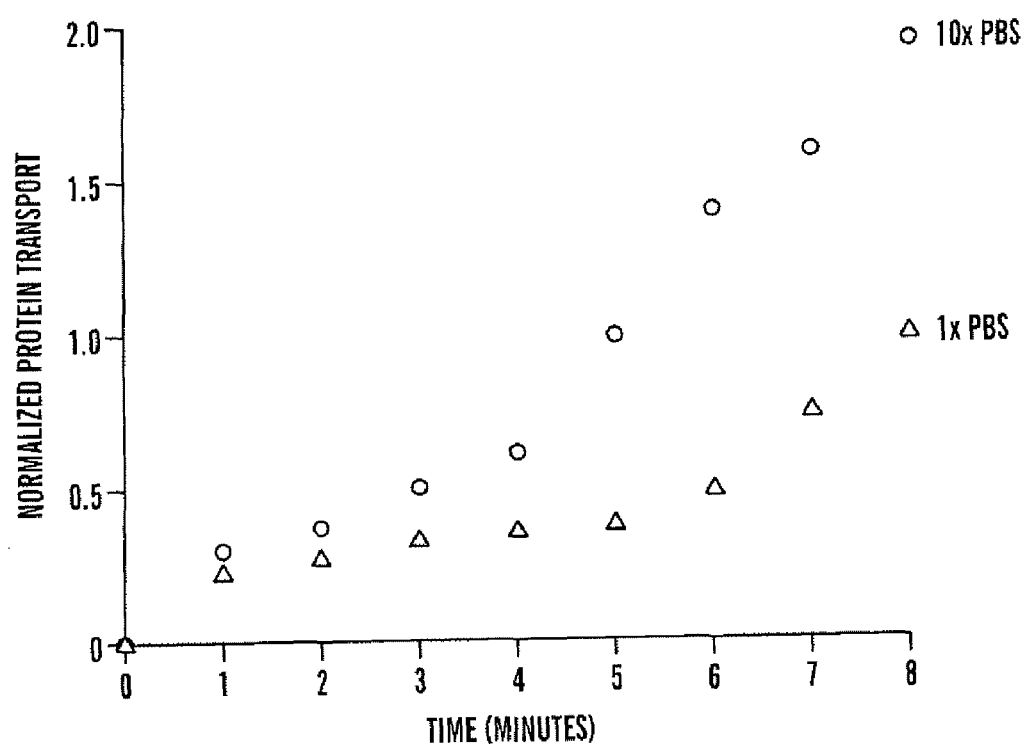
FIG. 21 shows the transport for fluorescently labeled IgG, diffusing in microscope chamber experiments (see, e.g., FIG. 16A). Consistent with the expectation that nanomembranes carry intrinsic negative charge, increasing the ionic strength of the solvent enhances the rate of diffusion through membranes. Protein transport is doubled with 10× concentrated PBS buffer.

It is noteworthy that the mean size of the membranes is larger than the size of the protein they appear to retain. For example IgG, with a hydrodynamic radius of 7 nm (Luby-Phelps et al., "Hindered Diffusion of Inert Tracer Particles in The Cytoplasm of Mouse 3T3 Cells," *Proc. Natl. Acad. Sci.* 84(14):4910-3 (1987), which is hereby incorporated by reference in its entirety) is largely excluded from passage through membranes with a significant number of pores that should permit passage (>14 nm). The results suggest effective pore diameters that are smaller than the physical measurements in TEM, and/or effective protein sizes for filtration that are larger than the hydrodynamic radii determined in sedimentation assays. One reasonable possibility for smaller pore sizes is that a surface oxide layer is present on membranes after manufacturing. Such layers naturally contain negative charges that should draw counter (positive) ions to the membrane surface in an ionic solution. Given the nanometer dimensions of pores, positive charges could dominate the interior of the pores and retard the passage of negatively charged species. Martin et al. have demonstrated this principle for nanotubes under similar circumstances for small charged molecules (Martin et al., "Controlling Ion-Transport Selectivity in Gold Nanotubule Membranes," *Adv. Mater.* 13:1351-1362 (2001), which is hereby incorporated by reference in its entirety). Consistent with the proposal that nanoscale ordering of charges could reduce the permeability of pnc-Si membranes, faster passage of IgG using a higher ionic strength buffer was found (FIG. 21). The concentration of ions in this solution should significantly reduce the depth of organized charge (the debye layer). With an isoelectric point of 7.2, the IgG molecule itself should be neutral (as a temporal average) in PBS (pH 7.3), however the Alexa dye that was used to follow proteins carries a charge of −2 in neutral pH. Because the charge on the protein will fluctuate, one might expect the phenomenon to slow but not to block the labeled IgG. Thus, the results obtained thus far are consistent with the idea that the permeability of pnc-Si membranes can be tuned by manipulating surface charge.

Example 7

Comparison of Porous Nanocrystalline Silicon Membrane Against Commercial Protein Separation Filters A pnc-Si membrane was compared to two commercially available protein separation filters, 100 kD Nanosep™ and 50 kD dialysis membrane, both of which were obtained from their manufacturers (Pall Corporation, East Hills, N.Y.; and Spectrum Laboratories, Rancho Dominquez, Calif., respectively). The proteins from each experiment were analyzed with gel electrophoresis to determine size separation. In each gel, the left lane or column is the ladder standard (L), which identifies the location of different sized proteins. The smaller proteins migrate further down the gel. The column identified by (C) is the control, which contains all of the proteins in the extract for each experiment. (R) is the retentate, which are the larger proteins retained above or behind the filter media. (F) is the filtrate, which contains the proteins that passed through the filter media.

Figures 22A, 22B, 22C:
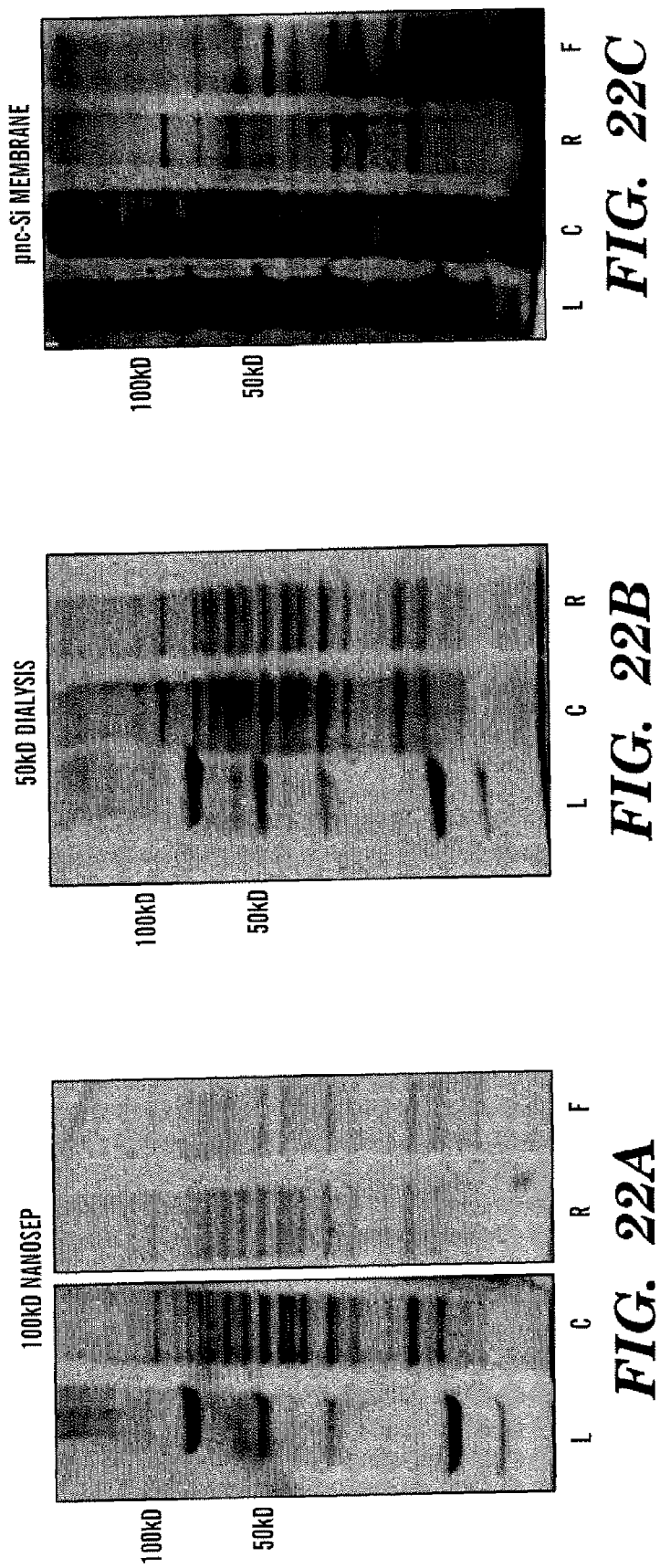
FIGS. 22A-C are gel electrophoresis experiments showing that pnc-Si membranes demonstrate a clear cut-off when filtering high concentration brain bovine extract ("BBEC"). The experiment in FIG. 22A employed Nanosep columns. The experiment in FIG. 22B employed a commercial dialysis membrane. The experiment in FIG. 22C employed pnc-Si membranes according to the present invention. L is the ladder standard, C is the control, R is the retentate, and F is the filtrate.

In the Nanosep experiment (FIG. 22A), 200 μL clarified BBEC (1.2 mg/mL) was spun using 100 kD cutoff Nanosep columns (Pall Life Sciences) for 5 minutes at 14000 g. Samples were recovered from both top and bottom of filter, and the retentate was diluted to match the concentration of filtrate. The Nanosep columns retained proteins under the specified 100 kD cutoff, and high losses were observed in comparison to the pre-spun control. After removal of samples, a noticeable brown stain remained in the membrane, most likely due to proteins trapped within the relatively thick membrane. 50 kD cutoff dialysis tubing (FIG. 22B) was used to separate 1 mL BBEC (1.2 mg/mL). After 24 hours, the retentate was removed (since the filtrate was diluted into a large vessel, it could not be run on a gel). Very little protein below the specified cut-off was filtered. With the pnc-Si filters (FIG. 22C), it was possible to use a much higher concentration of protein without clogging. 1.5 μL BBEC (6 mg/mL) was separated using the pnc-Si membrane and a 50 mL PBS reservoir. Proteins greater than 50 kD remained in the retentate, while proteins smaller than 50 kD became very dilute since they easily diffused across the membrane into the filtrate. The pnc-Si membranes showed very little loss of sample compared to Nanosep membranes. (L=Ladder, C=Control, R=Retentate, F=Filtrate)

Example 8

Voltage-Gated Nanoscale Membranes

One distinctive aspect of pnc-Si membranes is their molecular height. By contrast, the membrane pores used in previously reported switching methodologies discussed in the literature are approximately 1000× longer than they are wide. This extreme aspect ratio limits the peak transport efficiency. Given the rapid diffusion of molecules through pnc-Si membranes, as demonstrated in the preceding Examples, the ultrathin membranes according to the present invention should overcome this limitation upon demonstration of strong switching behavior. Furthermore, the membranes are not limited to small ion transport, but should allow macromolecules like proteins to be selectively transported (as demonstrated above). The membranes are also created using an inexpensive fabrication on a silicon platform, which should enable their simple integration into microfluidic systems. Because these ultrathin porous membranes are fundamentally different (material, aspect ratio, fabrication, etc.) than the membranes previously studied for active switching, it is expected that voltages will tend to move charged species through the membrane and that surface charges will tend to restrict the passage of like-charged molecules. These principles will be tested in the prospective experimental work described below.

Negative surface charge occurs naturally as oxide layers develop on silicon surfaces during manufacturing. A voltage applied to pnc-Si membranes coated with conducting metals can induce additional negative charge. Charged membrane surfaces should attract counter ions from solution into pores and limit entrance by similarly charged molecules. For conductive membranes, either positive or negative voltage can be applied, and so positively charged macromolecules could be also be restricted. These behaviors will allow for the active control of these unique membranes in microfluidic devices that separate and analyze proteins.

In a first experiment, the extent to which the intrinsic permeability of a pnc-Si membrane is determined by surface charge produced during manufacturing will be assessed. In a second experiment, the potential to actively manipulate the surface charge of pnc-Si membranes coated with conductive metals will be examined. In a third experiment, electrophoretic flows past pnc-Si membranes will be established. To avoid ambiguous conclusions, the transport of well-defined quantum dots will be examined (but results obtained with the quantum dots should confirm the capability of achieving similar results with proteins and small charged molecules).

Experiment 1

It is known that oxide layers that naturally grow on pnc-Si membranes during manufacturing will cause fixed surface charges that may affect protein transport. These charges may explain why some proteins are apparently unable to pass through certain membranes that have a significant numbers of pores larger than the protein's hydrodynamic radius. Demonstrating that charge dependent permeability is an intrinsic property of pnc-Si membranes will be an important baseline for studies into active control of transport.

The general strategy will be to monitor the passage of fluorescent species with controlled charges using a fluorescent microscope. With the assumption that the membranes carry net negative charge after manufacturing, the expectation is that negatively charged species will be blocked (or pass more slowly) through pnc-Si membranes. Because the amine and carboxyl groups found on proteins have pKAs around 3 and 8 respectively, one approach would be to examine the diffusion of proteins through pnc-Si membranes in electrolyte (Phosphate Buffered Saline) solutions of different pHs. Neutralizing the negatively charged molecules should hasten transport, however protein sizes or membrane charge may be affected by pH changes, and so results obtained with this procedure may be challenging to interpret.

To avoid complications in interpretations, amine and carboxyl derivatized quantum dots will be used as test species instead of proteins. This model system is ideal because, unlike with proteins, charge and particle size are independently controlled for quantum dots. Quantum dots with amine and carboxyl surface coatings are commercially available from Evident Corp. The company offers these surface chemistries, as well as neutral surfaces, on 25 nm (hydrodynamic) diameter quantum dots with a variety of fluorescence emissions. Pnc-Si membranes with the majority of pores between 20 and 40 nm can be readily manufactured and used in these experiments. Transport of positively, neutral, and negatively charged particles through the membranes will be monitored using the same flow chambers used to monitor the separation of fluorescent proteins by pnc-Si membranes. The expectation is that COO— quantum dots will pass slower through pnc-Si membranes despite being the same size as neutral and amine particles.

With this experimental design, there are additional experiments which will reinforce these interpretations. First, the charges on both positive and negatively charged quantum dots will be neutralized using carbimimide reactions with acetate and aminomethane, respectively. The expectation is that neutralized versions of COO— particles and amine particles will diffuse through pnc-Si membranes at the same rate as neutral particles.

Experiment 2

In a second type of experiment to confirm the role of membrane surface charge in species transport, the ionic strength of the solute containing charged quantum dots will be increased by increasing salt (KCl) concentrations from 0 to 0.5 M. The expectation is that as ionic strengths increase, the depth of the debye layer that shields surface charge will grow smaller than pore diameters, and so the differences between the rates of transport for charged and uncharged species will diminish.

Regardless of whether the intrinsic charge on pnc-Si membranes is sufficient to affect the transport of charged species, it should be possible to intentionally charge pnc-Si membranes provided they are coated with a conducting material. The active manipulation of charge from an exogenous source provides the best opportunity to actively manipulate the selectivity of pnc-Si membranes.

The experiments conducted under this study are similar to those outlined above except that the pnc-Si membranes used will be manufactured with gold coatings. Pnc-Si membranes will be coated by two techniques. First, coating will occur using standard evaporation techniques. Evaporation should produce a uniform gold layer on one side of pnc-Si membranes. Because the interior surface of pores should be uncoated, it is unclear if this coating approach would be as effective as a technique that coated all surfaces with gold. One such technique is electroless gold plating—a chemical reduction process that involves the catalytic reduction of gold ions in solution and the subsequent deposition of the ions into a surface layer. To ensure efficient deposition it may be necessary for the surface to carry surface bound amines, in which case the silicon surfaces of pnc-Si membranes can be pre-treated with aminosilane. The transformation of the pnc-Si surfaces will be confirmed by SEM. If coating is found to significantly reduce pore diameters, larger pore membranes will be used for the starting material and/or the exposure of the surfaces to gold ions will be adjusted to limit the growth the deposited layer.

The rate of passage of charged, uncharged, and neutral quantum dots through gold-coated pnc-Si membranes will be assessed using quantitative fluorescence microscopy. These experiments will establish baseline transport through the gold-coated membranes. By attaching the coated membranes to a voltage source, the charge carried by the membranes will be directly manipulated. It is expected to find slower transport of negatively charged species and that the transport rate varies inversely with the voltage applied. As in method described for Experiment 1, the use of quantum dots with neutralized charges will serve as controls because their transport should be voltage independent. In addition, increasing the ionic strength of the solution should diminish the ability of voltage to regulate the permeability of pnc-Si membranes to charged species.

Experiment 3

In electrophoresis, a charged species is transported between electrodes when a voltage is applied across an electrolyte solution. Regardless of the charge on pnc-Si membranes, it should be possible to modulate the passage of charged species through pnc-Si membranes by positioning electrodes on either side of the membrane.

These experiments will again compare the transport of positive, neutral, and negatively charged quantum dots through (uncoated) pnc-Si membranes using a microscope-based diffusion chamber, except that platinum electrodes will be placed upstream and downstream and a voltage will be applied to the solutions. Positive and negative quantum dots will be placed together on one side of the membrane. Transport will be compared for voltages varying between 0 and 2 V. Bubbles caused by electrolysis could easily block large sections of membrane and confound experiments, and so degassing solutions prior to the experiments and limiting voltages to 2 V (Kuo et al., "Molecular Transport Through Nanoporous Membranes," *Langmuir* 17:6298-6303 (2001)) will help minimize the formation of oxygen bubbles. Additionally, one can conduct experiments with the membrane vertical so that bubbles would be unlikely to remain proximal to the membranes. The expectation is that the rate of transport of either positive or negative species can be controlled by the magnitude and polarity of the applied voltage. Meanwhile the oppositely charged species should migrate away from the membrane and thereby remain trapped in the starting chamber. These experiments provide an alternative to direct manipulation of membrane charge for controlled transport past pnc-Si membranes.

Example 9

Modification of Dialysis Machine Using Porous Nanocrystalline Silicon Membrane

The potential to use pnc-Si membranes in large-scale renal dialysis will be examined with the expectation that the membranes will selectively remove small protein toxins ($\beta_2$ microglobulin) that currently cause significant discomfort to patients undergoing dialysis treatments (Raj et al., "Beta(2)-microglobulin Kinetics in Nocturnal Haemodialysis," *Nephrol. Dial. Transplant* 15(1):58-64 (2000), which is hereby incorporated by reference in its entirety). The mechanical strength of pnc-Si membranes makes the construction of an assembly for large-scale applications like dialysis appear feasible.

A plurality of silicon wafers will be assembled into a flow-through device where the membranes are characterized by maximal pore sizes of about 20 nm. When retrofitted onto to dialysis equipment (i.e., replacing traditional dialysis tubing), blood flowing over the surface of the membrane will allow the small protein toxin and certain salts to diffuse across the membrane, thereby removing it from blood to be returned to a patient.

Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed is:

1. A nanoporous membrane exposed on opposite sides thereof and having an average thickness of less than about 100 nm, wherein the membrane comprises nanocrystalline silicon and has a surface roughness of less than 1 nm on both sides thereof, wherein said nanoporous membrane is prepared according to a process comprising:

applying a nanoscale silicon film to one side of a substrate;
    forming a passage through the substrate, thereby exposing the film on both sides thereof to form a membrane; and
    annealing the silicon at a temperature effective to convert the silicon into a nanocrystalline form, thereby forming a plurality of randomly spaced pores in the nanoporous membrane.

2. The nanoscale membrane according to claim 1 wherein the process further comprises at least partially coating one side of the membrane with a metal.

3. The nanoscale membrane according to claim 2 wherein the metal is selected from the group of gold, silver, copper, platinum, aluminum, chromium, titanium, tungsten, lead, tin, palladium, and alloys thereof.

4. The nanoscale membrane according to claim 1 wherein the membrane is less than 50 nm thick.

5. The nanoscale membrane according to claim 1 wherein the membrane is less than about 10 nm thick.

6. The nanoscale membrane according to claim 1 wherein the membrane is characterized by a lateral length to thickness aspect ratio that is more than 10,000 to 1.

7. The nanoscale membrane according to claim 1 wherein the membrane is substantially planar.

8. The nanoscale membrane according to claim 1 wherein the average pore size is less than about 50 nm in diameter.

9. The nanoscale membrane according to claim 1 wherein the pore density is between $10^6$-$10^{12}$ cm$^{-2}$.

10. A filter device comprising at least one nanoscale membrane according to claim 1.

11. The filter device according to claim 10 further comprising:
a support having a passage extending between opposite surfaces of the support, wherein the at least one nanoscale membrane is bound to or positioned on the support, with the at least one nanoscale membrane confronting the passage.

12. The filter device according to claim 10 comprising two or more nanoscale membranes having different maximum pore sizes, wherein the two or more nanoscale membranes are serially positioned relative to the direction of fluid flow with a membrane having a smaller maximum pore size being downstream of a membrane having a larger maximum pore size.

13. The filter device according to claim 12 comprising three or more nanoscale membranes each having a different maximum pore size.

14. The filter device according to claim 10 wherein the support is formed of silicon.

15. The filter device according to claim 11 further comprising an adapter having an inlet and an outlet, with the support being secured to the adapter such that the passage is in fluid communication with the inlet and outlet.

16. The filter device according to claim 10 further comprising first and second conduits positioned in a substantially parallel arrangement, with the at least one nanoscale membrane positioned between the first and second conduits, whereby species smaller than a maximum pore size are capable of passing between the first and second conduits through the at least one nanoscale membrane.

17. The filter device according to claim 16 wherein the direction of fluid flow for the first and second conduits is in the same direction.

18. The filter device according to claim 16 wherein the direction of fluid flow for the first and second conduits is in the opposite direction.

19. The filter device according to claim 10 further comprising an electrode coupled to or positioned adjacent the at least one nanoscale membrane.

20. The filter device according to claim 19 wherein the electrode is an anode.

21. The filter device according to claim 19 wherein the electrode is a cathode.

22. The filter device according to claim 19, wherein the device comprises a first electrode positioned on one side of the nanoscale membrane and a second electrode positioned on an opposite side of the nanoscale membrane, whereby upon introduction of an electrolyte solution across the nanoscale membrane, the first and second electrodes are capable of applying a voltage across the electrolyte solution.

23. The filter device according to claim 22 further comprising a third electrode in contact with the nanoscale membrane.

24. The filter device according to claim 10 further comprising one or more capture molecules tethered to the membrane within the pores or on a surface of the membrane.

25. The filter device according to claim 10 further comprising one or more non-binding, screening, or repulsive molecules tethered to the membrane within the pores or on a surface of the membrane.

26. The nanoporous membrane according to claim 1, wherein the process further comprises:
applying a sacrificial film either (i) to the one side of the substrate prior to said applying the nanoscale film, (ii) over the nanoscale film after said applying the nanoscale film, or (iii) both (i) and (ii).

27. The nanoporous membrane according to claim 26 wherein both (i) and (ii) are carried out.

28. The nanoporous membrane according to claim 27 wherein each sacrificial film is an oxide film.

29. The nanoporous membrane according to claim 28 wherein each oxide film comprises silicon dioxide.

30. The nanoporous membrane according to claim 26 wherein said forming comprises:
masking a side of the substrate that is opposite the one side upon which the nanoscale silicon film is applied;
etching the substrate, beginning from the masked side of the substrate, to form the passage.

31. The nanoporous membrane according to claim 30 wherein said masking comprises applying an incomplete silicon dioxide film on the opposite side of the substrate, said substrate being formed of silicon.

32. The nanoporous membrane according to claim 31 wherein said etching is carried out using an etchant that has a silicon/silicon dioxide selectivity that is greater than about 10,000.

33. The nanoporous membrane according to claim 32 wherein said etching is carried out using an etchant comprising ethylenediamine, pyrocatechol, pyrazine, and water.

34. The nanoporous membrane according to claim 26 further comprising:
removing the sacrificial film or films after said etching.

35. The nanoporous membrane according to claim 34 wherein said removing is carried out after said annealing.

36. The nanoporous membrane according to claim 34 wherein said removing comprises exposing the sacrificial film or films to a buffered oxide etchant solution, or a hydrofluoric acid etchant solution.

37. The nanoporous membrane according to claim 30 wherein said etching is carried out in a container that exposes substrate to etchant solution only from the masked side thereof.

38. The nanoporous membrane according to claim 37 further comprising:
heating and/or stirring etchant solution during said etching.

39. The nanoporous membrane according to claim 1 wherein said applying comprises radio-frequency magnetron sputtering, low pressure chemical vapor deposition, plasma enhanced chemical vapor deposition, thermal chemical growth, radio frequency sputtering, DC sputtering, thermal evaporation, electron beam evaporation, or electroplating.

40. The nanoporous membrane according to claim 1 wherein said applying further comprises changing conditions during silicon film deposition, the conditions being selected from the group of pressure changes, plasma density changes, plasma power changes, temperature changes, source material changes, and gas composition changes.

41. A nanoporous membrane comprising silicon nanocrystals, wherein the membrane is exposed on opposite sides thereof, has an average thickness of less than about 100 nm, and has a plurality of pores extending between the opposite sides thereof, wherein both of the opposite sides have a surface roughness of less than about 1 nm.

42. The nanoscale membrane according to claim 41 wherein the silicon is undoped silicon, p-doped silicon, or n-doped silicon.

43. The nanoscale membrane according to claim 42 wherein the silicon is doped with one or more of B, Al, Ga, In, P, As, Sb, and Ge.

44. The nanoscale membrane according to claim 41 wherein the membrane further comprises a coating of a metal at least partially covering one side of the membrane.

45. The nanoscale membrane according to claim 44 wherein the metal is selected from the group of gold, silver, copper, platinum, aluminum, chromium, titanium, tungsten, lead, tin, palladium, and alloys thereof.

46. The nanoscale membrane according to claim 41 wherein the membrane is less than 50 nm thick.

47. The nanoscale membrane according to claim 41 wherein the membrane is less than about 10 nm thick.

48. The nanoscale membrane according to claim 41 wherein the membrane is characterized by a lateral length to thickness aspect ratio that is more than 10,000 to 1.

49. The nanoscale membrane according to claim 41 wherein the average pore size is less than about 50 nm in diameter.

50. The nanoscale membrane according to claim 41 wherein the pore density is between $10^6$-$10^{12}$ cm$^{-2}$.

51. The nanoscale membrane according to claim 41 wherein the membrane consists essentially of silicon nanocrystals.

52. The nanoscale membrane according to claim 41 wherein the silicon nanocrystals have a random nanocrystal orientation.

53. The nanoscale membrane according to claim 41 wherein the pores have a shape that is defined by in situ-formed silicon nanocrystals that form the membrane.

54. A filter device comprising at least one nanoscale membrane according to claim 41.

55. The filter device according to claim 54 further comprising:
a support having a passage extending between opposite surfaces of the support, wherein the at least one nanoscale membrane is bound to or positioned on the support, with the at least one nanoscale membrane confronting the passage.

56. The filter device according to claim 54 comprising two or more nanoscale membranes having different maximum pore sizes, wherein the two or more nanoscale membranes are serially positioned relative to the direction of fluid flow with a membrane having a smaller maximum pore size being downstream of a membrane having a larger maximum pore size.

57. The filter device according to claim 54 comprising three or more nanoscale membranes each having a different maximum pore size.

58. The filter device according to claim 54 wherein the support is formed of silicon.

59. The filter device according to claim 55 further comprising an adapter having an inlet and an outlet, with the support being secured to the adapter such that the passage is in fluid communication with the inlet and outlet.

60. The filter device according to claim 54 further comprising first and second conduits positioned in a substantially parallel arrangement, with the at least one nanoscale membrane positioned between the first and second conduits, whereby species smaller than a maximum pore size are capable of passing between the first and second conduits through the at least one nanoscale membrane.

61. The filter device according to claim 60 wherein the direction of fluid flow for the first and second conduits is in the same direction.

62. The filter device according to claim 60 wherein the direction of fluid flow for the first and second conduits is in the opposite direction.

63. The filter device according to claim 54 further comprising an electrode coupled to or positioned adjacent the at least one nanoscale membrane.

64. The filter device according to claim 63 wherein the electrode is an anode.

65. The filter device according to claim 63 wherein the electrode is a cathode.

66. The filter device according to claim 63, wherein the device comprises a first electrode positioned on one side of the nanoscale membrane and a second electrode positioned on an opposite side of the nanoscale membrane, whereby upon introduction of an electrolyte solution across the nanoscale membrane, the first and second electrodes are capable of applying a voltage across the electrolyte solution.

67. The filter device according to claim 66 further comprising a third electrode in contact with the nanoscale membrane.

68. The filter device according to claim 54 further comprising one or more capture molecules tethered to the membrane within the pores or on a surface of the membrane.

69. The filter device according to claim 54 further comprising one or more non-binding, screening, or repulsive molecules tethered to the membrane within the pores or on a surface of the membrane.

70. A microfluidic device comprising the filter device according to claim 54.

71. A dialysis machine comprising a filter device according to claim 54.

72. A fuel cell comprising a nanoscale membrane according to claim 41, wherein the nanoscale membrane selectively passes positively charged species.

73. A method of filtering nanoscale products comprising:
providing at least one nanoscale membrane according to claim 41; and
passing a fluid, containing one or more products to be filtered, through the membrane, whereby objects larger than a maximum pore size are effectively precluded from passing through the pores of the membrane.

74. The method according to claim 73 wherein said providing comprises two or more nanoscale membranes having different maximum pore sizes, wherein the two or more nanoscale membranes are serially positioned relative to the direction of fluid flow with a membrane having a smaller maximum pore size being downstream of a membrane having a larger maximum pore size.

75. The method according to claim 74 wherein said providing comprises three or more nanoscale membranes each having a different maximum pore size.

* * * * *